United States Patent
Choquette

(10) Patent No.: US 10,312,996 B2
(45) Date of Patent: Jun. 4, 2019

(54) SYSTEMS AND METHODS FOR USING ADAPTIVE CODING AND MODULATION IN A REGENERATIVE SATELLITE COMMUNICATION SYSTEM

(71) Applicant: Hughes Network Systems, LLC, Germantown, MD (US)

(72) Inventor: George Choquette, Potomac, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 396 days.

(21) Appl. No.: 15/281,737

(22) Filed: Sep. 30, 2016

(65) Prior Publication Data

US 2018/0167133 A1   Jun. 14, 2018

(51) Int. Cl.
| | | |
|---|---|---|
| H04B 7/185 | (2006.01) | |
| H04L 1/00 | (2006.01) | |
| H04W 76/10 | (2018.01) | |

(52) U.S. Cl.
CPC ....... *H04B 7/18513* (2013.01); *H04L 1/0003* (2013.01); *H04L 1/0009* (2013.01); *H04W 76/10* (2018.02)

(58) Field of Classification Search
CPC ................................................ H04B 7/18513
See application file for complete search history.

(56) References Cited

U.S. PATENT DOCUMENTS

| | | | |
|---|---|---|---|
| 6,070,074 A | 5/2000 | Perahia | |
| 6,859,466 B1 | 2/2005 | Chen | |
| 8,320,296 B2 * | 11/2012 | Becker | H04B 7/18582 370/316 |
| 2002/0142718 A1 | 10/2002 | Nawata | |
| 2008/0165840 A1 | 7/2008 | Morris | |
| 2009/0279475 A1 | 11/2009 | Vanderaar | |
| 2009/0323583 A1* | 12/2009 | Scott | H04B 7/18515 370/316 |
| 2010/0150053 A1* | 6/2010 | Becker | H04B 7/18504 370/316 |

(Continued)

OTHER PUBLICATIONS

International Search Report and Written Opinion for PCTIB2017056049 dated Feb. 2, 2018, 12 pages.

*Primary Examiner* — Min Jung
(74) *Attorney, Agent, or Firm* — Sheppard Mullin Richter & Hampton LLP; Daniel N. Yannuzzi; Jonathan A. Marina

(57) ABSTRACT

Techniques are described for implementing adaptive coding and modulation (ACM) in regenerative satellite systems to adapt the modulation and/or FEC coding of transmitted waveforms to the conditions of the link. In a first implementation, ACM is implemented on an uplink from a terminal to a regenerative satellite. In this implementation, an uplink modulation and coding combination (ModCod) is estimated by the transmitting terminal based on the quality of signals received from the regenerative satellite on the downlink. In a second implementation, ACM may be implemented on a downlink from a regenerative satellite to a terminal. In this implementation, a transmit terminal may insert a field in a transmitted packet header that indicates a downlink ModCod to be used by the regenerative satellite when transmitting packets to a receiving terminal. The regenerative satellite may reencode and remodulate the packet using the ModCod indicated in the field of the packet header.

22 Claims, 18 Drawing Sheets

(56) References Cited

U.S. PATENT DOCUMENTS

| | | | |
|---|---|---|---|
| 2013/0195148 A1* | 8/2013 | Kim | H04L 1/0079 |
| | | | 375/146 |
| 2014/0056335 A1 | 2/2014 | Ryu | |
| 2014/0082675 A1* | 3/2014 | Kim | H04L 27/2601 |
| | | | 725/64 |
| 2015/0139072 A1* | 5/2015 | Hong | H04W 72/0446 |
| | | | 370/326 |
| 2016/0037434 A1 | 2/2016 | Gopal | |
| 2017/0230105 A1* | 8/2017 | Baudoin | H04B 7/18517 |
| 2017/0230890 A1* | 8/2017 | Baudoin | H04W 40/16 |

* cited by examiner

| Modcod No. | ModCod | Entry Es/No (dB) | Exit Es/No (dB) |
|---|---|---|---|
| 4 | QPSK 1/2 | 2.1 | 1.7 |
| 5 | QPSK 3/5 | 3.3 | 2.9 |
| 6 | QPSK 2/3 | 4.1 | 3.7 |
| 7 | QPSK 3/4 | 5.2 | 4.8 |
| ... | ... | ... | ... |
| 14 | 8PSK 3/4 | 9.1 | 8.7 |
| ... | ... | ... | ... |
| 28 | 32APSK 9/10 | 17.0 | 16.6 |

| Destination Address | Requested Downlink ModCod |
|---|---|
| Terminal (or GW) 2 Address | 7 |
| Terminal (or GW) 3 Address | 14 |
| Terminal (or GW) 4 Address | 14 |
| Terminal (or GW) 5 Address | 4 |
| ... | ... |

SYSTEMS AND METHODS FOR USING ADAPTIVE CODING AND MODULATION IN A REGENERATIVE SATELLITE COMMUNICATION SYSTEM

TECHNICAL FIELD

The present disclosure relates generally to satellite networks. More particularly, some embodiments of the present disclosure are directed toward systems and methods for using adaptive coding and modulation in a regenerative satellite communication system.

BACKGROUND

Modern satellite communication systems provide a robust and reliable infrastructure to distribute voice, data, and video signals for global exchange and broadcast of information. These satellite communication systems have emerged as a viable option to terrestrial communication systems for carrying data traffic such as Internet traffic. A typical satellite Internet system comprises subscriber terminals, a satellite, a ground station, and connectivity to the internet. Communication in such a system occurs along two paths: 1) a forward path comprising an uplink from a subscriber terminal to the satellite to a downlink to the ground station to the internet; and 2) a return path comprising a path from the internet to the ground station to an uplink to the satellite to a downlink to the subscriber terminal.

Adaptive coding and modulation (ACM) is a technique used in some satellite systems to adapt the modulation and/or forward error correction (FEC) coding of the transmitted waveform to the conditions of the link as appropriate for each receiving terminal. Per-terminal link conditions might be affected by substantially static factors such as antenna pointing accuracy of a transmitting or receiving terminal, as well as by dynamic factors such as changing weather attenuation affecting uplink or downlink propagation. The objective of ACM is to meet a target receive signal quality at the destination of the communication path (e.g., bit error rate, packet loss rate, or other metric) while maximizing link capacity (e.g., bits/symbol or bits/Hertz).

ACM might be used to optimize a point-to-point communication link, such as from a terminal transmitting an uplink carrier, through a transponded, bent-pipe, satellite, to a terminal receiving the transponded carrier on the downlink. ACM may also be used to optimize point-to-multipoint links, such as an uplink carrier transmitted through a bent pipe satellite to a set of receivers within the same downlink spot beam, onto which carrier are multiplexed data packets each destined to one or more of the several receiving terminals.

To date, ACM techniques have not been applied in regenerative satellite systems. In a regenerative satellite system, the satellite itself has digital processing hardware. This provides several advantages. First, the regenerative satellite demodulates, decodes, encodes, and remodulates the digital uplink signal to form a downlink signal. This provides separation of the uplink from downlink by regenerating the digital signal and can save in the link budget's signal strength. Second, this digital on-board processing permits the satellite to take the data packets it receives on the uplink and route or switch it to particular downlink locations. Additionally, satellite demodulators on the uplink may be assigned to particular uplink spotbeams to listen to assigned uplink frequencies, i.e., uplink sub-bands. The satellite's uplink antennas and demodulators are able to separate and differentiate signals from satellite terminals transmitting from these uplink spot beams. This allows reuse of a same frequency in different uplinks, providing a major increase in frequency efficiency.

SUMMARY

Techniques are described for implementing ACM in regenerative satellite systems to adapt the modulation and/or FEC coding of transmitted waveforms to the conditions of the uplink or downlink.

In a first embodiment, ACM may be implemented on an uplink from a terminal to a regenerative satellite. In this embodiment, a terminal transmitting on an uplink may include: a receiver configured to receive a signal on a downlink from a regenerative satellite; a module for determining a quality of the received signal; a module for determining an uplink modulation and coding combination (ModCod) for uplink transmissions to the regenerative satellite based on the determined quality of the signal; and a transmitter configured to transmit a signal on an uplink to the regenerative satellite, where the signal transmitted on the uplink is modulated and encoded based on the determined ModCod.

The transmitting terminal may be at least one of a gateway, a hub, and an earth station. Alternatively, the transmitting terminal may be a very small aperture terminal (VSAT). In implementations, the uplink ModCod is determined by mapping, using a table, the determined quality of the received signal to the uplink ModCod. For example, a received signal ratio of mean energy per symbol to noise power spectral density ($E_sN_0$) may be mapped to the uplink ModCod.

In a second embodiment, ACM may be implemented on a downlink from a regenerative satellite to a terminal. In this embodiment, a transmitting terminal may receive from a receiving terminal, at least one of a downlink modulation and coding combination (ModCod) and receive signal metrics. In response to receiving the at least one of a downlink ModCod and receive signal metrics, the transmitting terminal may insert into a header of a packet a field indicating a downlink ModCod to be used by a regenerative satellite when transmitting on a downlink to the receiving terminal; and transmit on an uplink, the packet to a regenerative satellite. In one implementation, the transmitting terminal receives the downlink ModCod from the receiving terminal and updates a table indicating a downlink ModCod for the receiving terminal. In another implementation, the transmitting terminal receives the receive signal metrics and maps the receive signal metrics to the downlink ModCod. The receive signal metrics may include an $E_sN_0$.

In implementing ACM on a downlink, a regenerative satellite system may include a regenerative satellite that includes: a receiver configured to receive a signal; circuitry for demodulating and decoding the received signal to obtain a packet; circuitry for reading, from a header of the packet, a field indicating a downlink modulation and coding combination (ModCod) to be used when transmitting on a downlink to a receiving terminal that is a destination of the packet; and circuitry for modulating and encoding the packet at the regenerative satellite based on the indicated downlink ModCod. In one implementation, the regenerative satellite receives the signal on an uplink from a transmitting terminal transmitting to the receiving terminal. In another implementation, the regenerative satellite receives the signal from a second regenerative satellite connected to the regenerative satellite over an inter satellite link.

In implementations, the regenerative satellite system includes one or more regenerative satellites connected to the regenerative satellite over inter satellite links. The regenerative satellites may be in elliptical orbit or in low earth orbit. In such implementations, the regenerative satellite may include a packet switch for determining if a destination downlink of a received packet is a downlink of a different satellite.

In a third embodiment, ACM may be implemented by a regenerative high altitude platform system on a downlink or uplink by applying the same methods disclosed herein for implementing ACM in a regenerative satellite system. The regenerative high altitude platform may comprise one or more aircrafts or one or more balloons.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 illustrates an example ACM trajectory table that may be implemented by the RX link adaptation module of FIG. 3 to determine what ModCod best meets a receive quality objective.

FIG. 16 illustrates an example destination downlink ModCod table that may be implemented by the transmitter link adaptation module of FIG. 15.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for implementing ACM in regenerative satellite systems to adapt the modulation and/or forward error correction (FEC) coding of transmitted waveforms to the conditions of the link.

In a first implementation, systems and methods are described for implementing ACM on an uplink from a terminal to a regenerative satellite. In this implementation, an uplink modulation and coding combination (ModCod) is estimated by the transmitting terminal based on the quality of signals received from the regenerative satellite on the downlink. This simplified uplink ModCod determination may be viable because the downlink and uplink between a given terminal and a given regenerative satellite go through the same propagation path and weather. By estimating the uplink ModCod at the transmitting terminal instead of the regenerative satellite, the regenerative satellite's hardware and software requirements are kept to a minimum, thereby avoiding the risk and expense of implementing this function in space.

In a second implementation, ACM may be implemented on a downlink from a regenerative satellite to a terminal. In this implementation, a transmit terminal may insert a field in a transmitted packet header that indicates a downlink ModCod to be used by the regenerative satellite when transmitting packets to a receiving terminal. On the downlink, the regenerative satellite may remodulate and reencode the packet using the ModCod indicated in the field of the packet header. By not requiring the regenerative satellite to determine and keep track of a downlink ModCod for each receiving terminal, the regenerative satellite's hardware and software requirements are again kept to a minimum.

Before describing in detail the disclosed systems and methods for implementing ACM in regenerative satellite systems, it is instructive to describe the use of ACM in transponded satellite systems, where satellites function as analog transponders that take uplink frequencies and shift them to their downlink frequencies in a bent-pipe fashion. FIGS. 1-7 illustrate implementations of ACM in transponded satellite systems.

Figure 1:
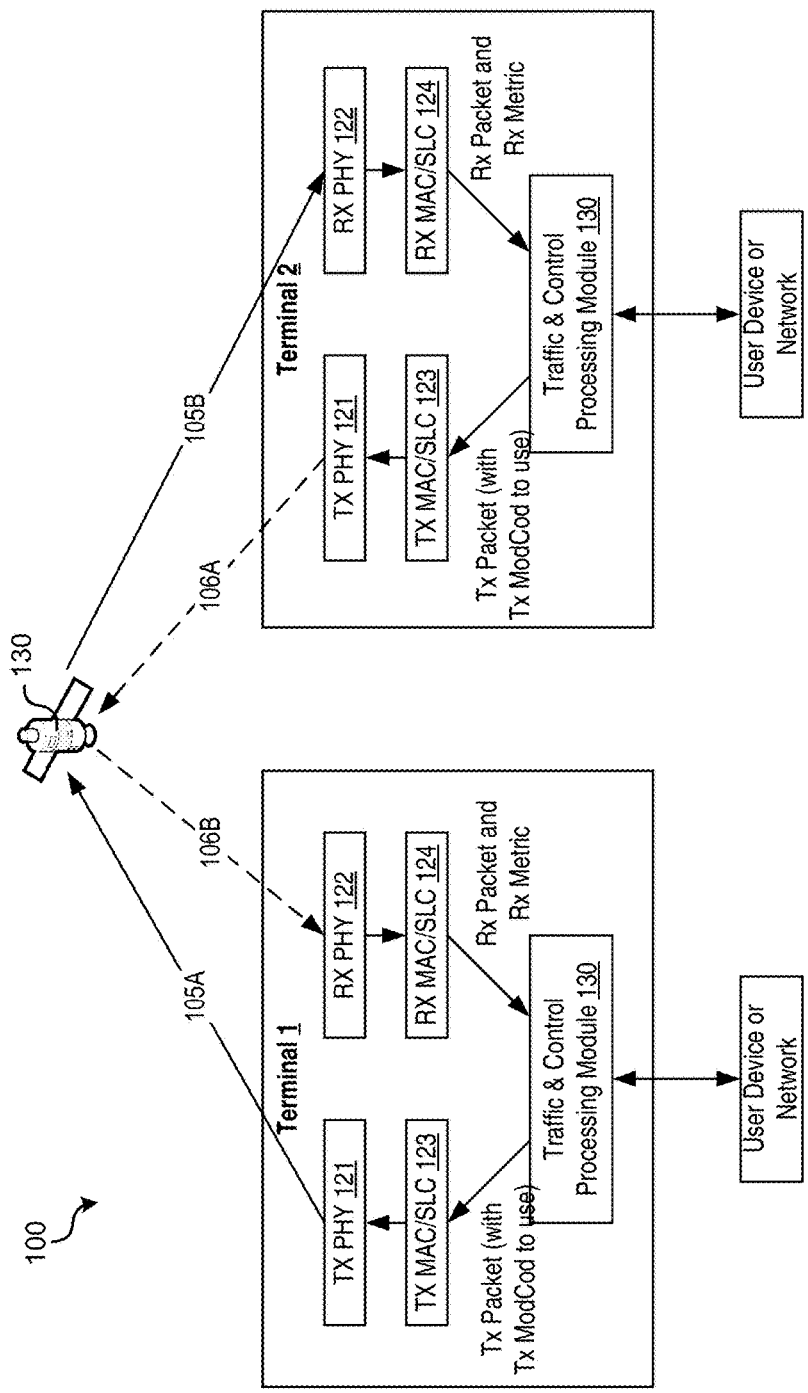
FIG. 1 illustrates a transponded satellite system 100 using ACM for point-to-point links between terminals.

FIG. 1 illustrates an example transponded satellite system 100 using ACM for point-to-point links between terminals. In this example, transponded satellite 130 provides a point-to-point link between terminal 1 and terminal 2, each of which are capable of ACM through connected transponded satellite 130. Each of terminal 1 and 2 may comprise a receiver physical layer (Rx PHY) 122, a receiver media access control/satellite link control module (Rx MAC/SLC) 124, a transmitter physical layer (Tx PHY) 121, a Tx MAC/SLC 123, and a traffic and control processing module 130. It should be noted that one of ordinary skill in the art will understand how other transmitter or receiver configurations can be implemented in each terminal, and that one or more of a terminal's components can be implemented in either digital form (e.g., as software running on a DSP or other processing device, with the addition of a DAC) or as analog components.

On the transmitter side, Tx PHY 121 may perform functions such as encoding, interleaving, modulation, and filtering, and Tx MAC/SLC 123 may perform functions such as scheduling, packet segmentation, and encryption. On the receiver side, Rx PHY 122 may perform functions such as radio frequency (RF) filtering, demodulation, deinterleaving, decoding, and receive signal quality measurement, and Rx MAC/SLC 124 may perform functions such as packet reassembly and decryption. Traffic and control processing module 130, further described below, may provide functions such as system management, user traffic management and control, and link adaptation.

During operation, terminal 1 may transmit on uplink 105A a first waveform carrying a packet at some ModCod. For example, the code may be any one of FEC codes 1/2, 2/3, 3/4, 5/6, 7/8, 8/9, 9/10, etc., and the modulation format may be any one of Amplitude Phase Shift Keying (APSK), Quadrature Phase Shift Keying (QPSK), π/M-MPSK, other orders of Multiple Phase Shift Keying MPSK, Quadrature Amplitude Modulation (QAM), and so on. In a particular implementation, the ModCod may be selected in accordance with the Digital Video Broadcasting-Satellite second generation (DVB-S2) standard. In implementations, a default robust ModCod is used during initial operation to prevent packet loss.

On the downlink 105B, receiving terminal 2 receives and processes the first waveform carrying the packet transmitted by terminal 1. Additionally, receiving terminal 2 measures one or more receive quality metrics (e.g., the ratio of mean energy per symbol to noise power spectral density ($E_sN_0$)), which can be used by system 100 to determine an appropriate ModCod to be used by transmitting terminal 1. Based on the one or more receive quality metrics, terminal 2 may generate a packet to request a ModCod change of terminal 1 to meet a target quality threshold. In one embodiment, the request for the ModCod change may be transmitted over uplink 106A using a second waveform, encoded using the last terminal 1 requested ModCod. Alternatively, the request may be transmitted as a part of a regularly scheduled traffic or control packet. After receiving the requested ModCod change over downlink 106B, terminal 1 may use the indicated ModCod for future transmissions to receiving terminal 2, until a new ModCod is indicated, or unless the transmitting terminal has not received communication from the receiving terminal (i.e., traffic or signaling in the opposite direction) for some period of time.

It should be noted that although the ModCod determination in this example implementation is made by the receiving terminal, in alternative implementations the ModCod determination may be made by the transmitting terminal or a control system based on quality metrics signaled by the receiving terminal.

By way of example, when a transmission path is experiencing some weather attenuation on the uplink to satellite 130 or the downlink from satellite 130, ACM link adaptation might cause a robust ModCod providing relatively high link margin to be used, such as QPSK modulation with rate 3/4 FEC coding, providing 1.5 bits/symbol of traffic carrying capacity and 0.5 bits/symbol of FEC coding. As the weather improves and attenuation lessens, ACM link adaptation might cause a less robust ModCod to be used, such as 8PSK modulation with rate 3/4 FEC coding, providing 2.25 bits/symbol of traffic carrying capacity and 0.75 bits/symbol of FEC coding. As the weather further improves, the ModCod might be adapted to 8PSK with rate 9/10 FEC, providing 2.7 bits/symbol of traffic carrying capacity and 0.3 bits/symbol of FEC coding. In this manner, link traffic capacity is dynamically adapted to link quality as measured by the receiver.

Figure 2:
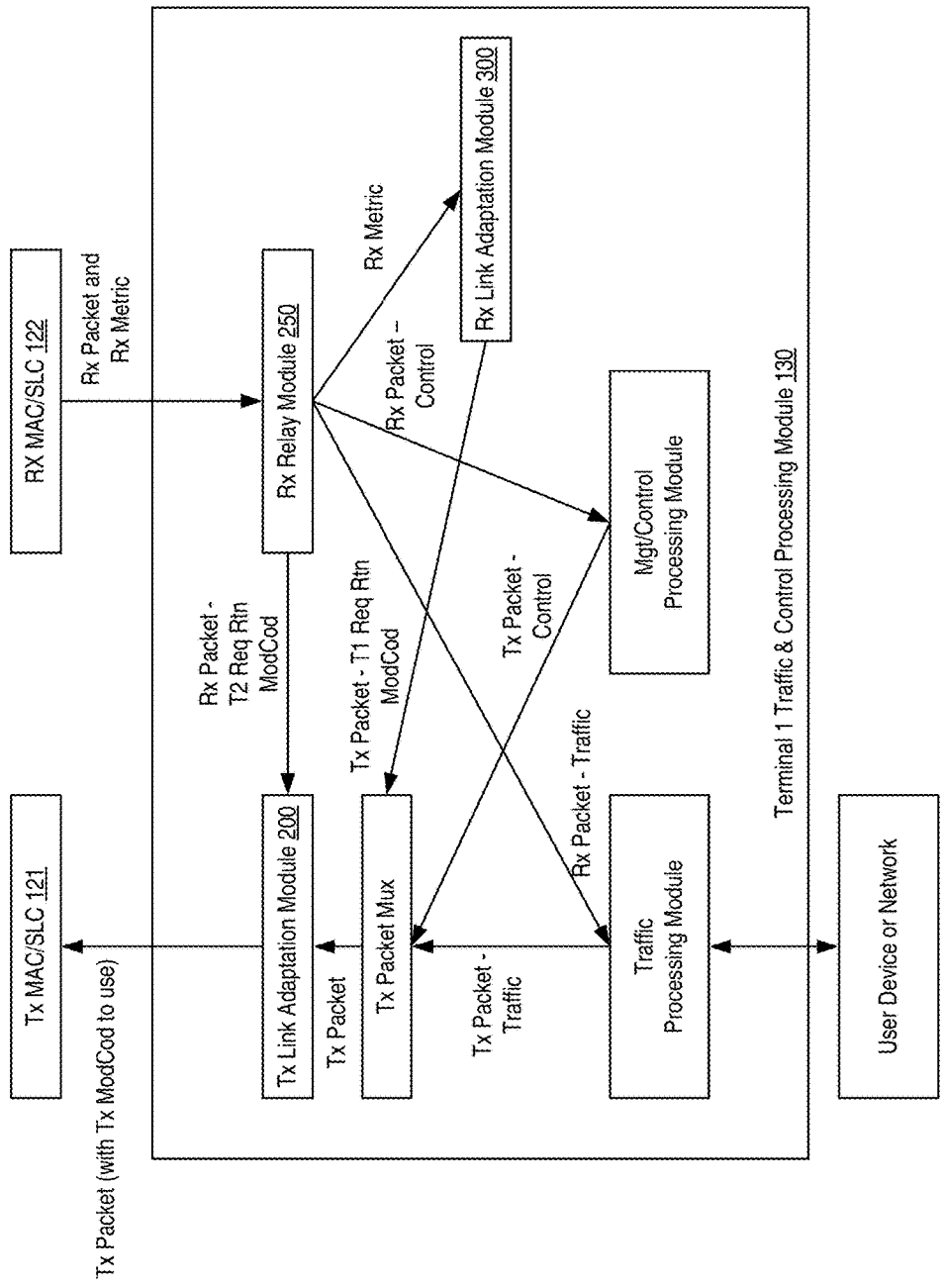
FIG. 2 is a block diagram illustrating an example operation of a traffic and control processing module for a terminal of the transponded satellite system of FIG. 1.

FIG. 2 is a block diagram illustrating an example operation of a traffic and control processing module 130 for a terminal of the transponded satellite system of FIG. 1. During operation, Tx link adaptation module 200 may track the most recent ModCod request by its peer terminal (e.g., terminal 1 may track the most recent ModCod requested by terminal 2) and signal Tx MAC/SLC 121 to use that ModCod for each transmit packet. In this example, Rx MAC/SLC 122 of terminal 1 may process packets received from terminal 2, and forward these packets to an Rx Relay module 250.

Depending on the type of packet, Rx Relay module 250 may forward a traffic packet to a Traffic Processing module, a management or control packet to a Mgt/Control Processing module, and a requested return ModCod packet, containing request from terminal 2 that terminal 1 transmit future packets to terminal 2 using a particular desired ModCod, to a Tx Link Adaptation module 200. Other packet types and modules may exist and be supported by Rx Relay module 250. The Tx Link Adaptation module 200 may extract the desired ModCod from the requested return ModCod packet, save it for later use, and indicate to Tx MAC/SLC 121 to use the saved ModCod with each subsequent packet to be transmitted to terminal 2. Alternatively, if the requested return ModCod is included within the header of a traffic packet rather than being sent in a separate packet, Rx Relay module 250 may send the traffic packet to the Traffic Processing module, and copy the requested ModCod from the packet header and send it to the Tx Link Adaptation module 200.

Also shown in FIG. 2, Rx MAC/SLC 122 may send a receive quality metric (e.g., an $E_sN_0$ measurement) associated with a received waveform containing a packet, to Rx Relay module 250 to be forwarded to the Rx link adaptation module 300. The Rx link adaptation module 300 may determine what ModCod best meets a receive quality objective, and generate a ModCod request to send to its peer terminal when a change is required. The Rx link adaptation module 300 may send that request to a Tx Packet Mux, either as a packet to be inserted into the packet stream to be transmitted via the Tx Link Adaptation Module 200 and Tx MAC/SLC 121, or as a value to be inserted by the Tx Packet Mux into the header of some other traffic or control packet destined to the peer terminal 2.

Figure 3:
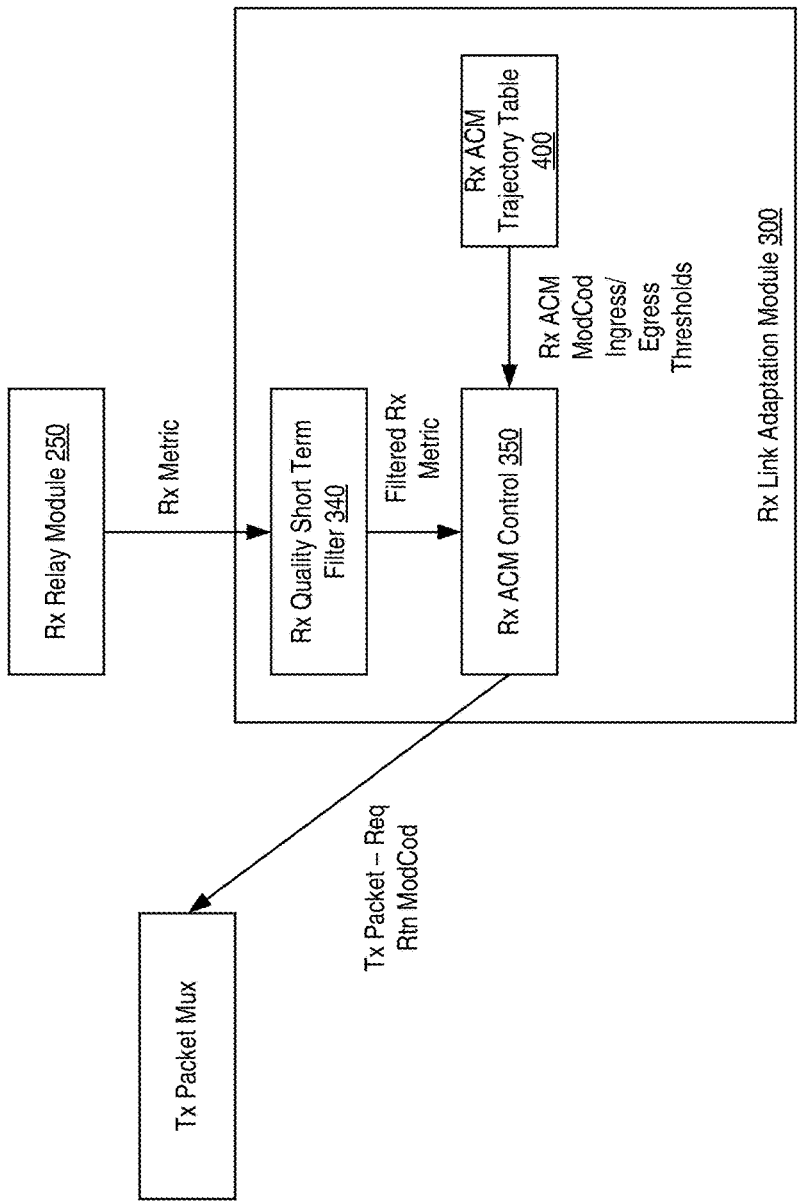
FIG. 3 is a block diagram illustrating an example operation of a receiver link adaptation module for traffic and control processing module of FIG. 2.

FIG. 3 is a block diagram illustrating an example operation of RX link adaptation module 300. FIG. 3 will be described concurrently with FIG. 4, which illustrates an example ACM trajectory table 400 that may be implemented by RX link adaptation module 300 to determine what ModCod best meets a receive quality objective. As illustrated, RX link adaptation module 300 may comprise a quality short term filter 340, an ACM control 350, and an ACM trajectory table 400. Filter 340 may provide hysteresis such that atmospheric and propagation transients that affect the receive waveform only momentarily do not trigger changes (e.g., a request to change ModCod).

ACM Control 350 may receive ACM ModCod ingress/egress thresholds from ACM trajectory table 400 to determine when to transition (up or down) between ModCod options, either to add more coding and/or change modulation to overcome link degradation, or to reduce coding and/or change modulation when degradation lessens. As illustrated by this example, ACM control 350 may cause periodic transmission of a ModCod request until the terminal obtains a desired signal quality.

ACM trajectory table 400 may specify a ModCod number or ID corresponding to a particular ModCod, an entry threshold indicating when to go up to a ModCod, and an exit threshold indicating when to go down to a lower ModCod. As illustrated in this embodiment, an $E_sN_0$ metric is used to determine when to transition between different ModCods. However, as would be appreciated by one having skill in the art, other metrics may be used to make the transition.

By way of example, consider a receiving terminal currently receiving waveforms at ModCod No. 5 (i.e., QPSK 3/5) with an $E_sN_0$ of 3.5 decibels (dB). If the terminal's $E_sN_0$ as filtered by short term filter 340 reaches or exceeds 4.1 dB, it may signal to go up from ModCod 5 to ModCod 6 (i.e., QPSK 2/3). As another example, the terminal would signal to drop down from ModCod 6 to ModCod 5 when its $E_sN_0$ as filtered by short term filter 340 drops to 3.7 dB or below.

Figure 5:
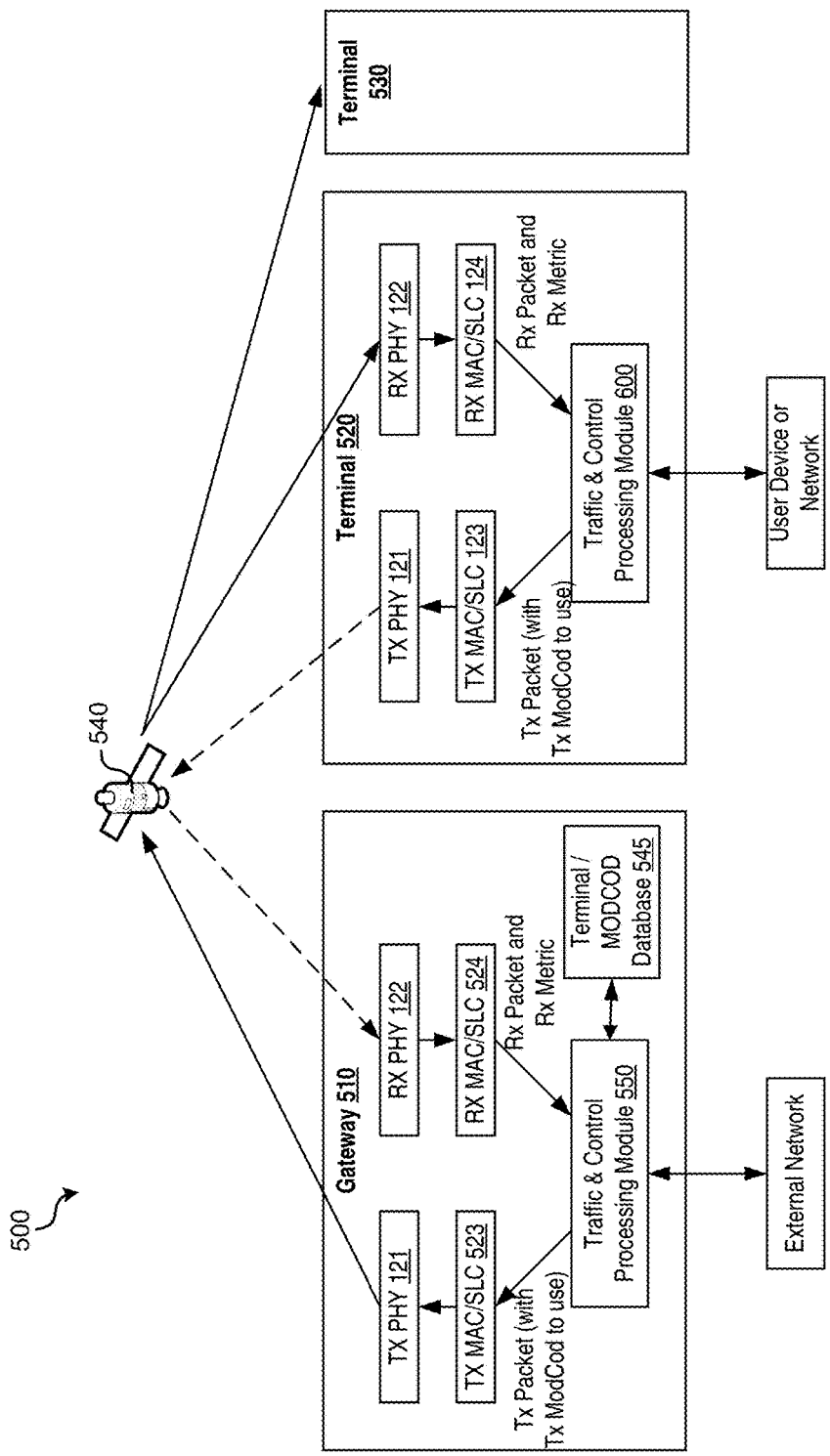
FIG. 5 illustrates an example transponded satellite system using ACM for point-to-multi-point links from a satellite gateway to terminals and for point-to-point links from terminals to the satellite gateway.

FIG. 5 illustrates an example transponded satellite system 500 using ACM for point-to-multi-point links from a satellite gateway 510 to terminals 520-530 and for point-to-point links from terminals to a satellite gateway. In this example configuration, gateway 510 transmits a carrier that is received by multiple terminals (e.g., terminals 520-530) in a satellite spot beam of satellite 540. The transmitted carrier carries multiplexed packets destined for the receiving terminals (e.g., terminals 520-530).

For each terminal, gateway 510 may use a ModCod requested by the terminal, such that a common transmit carrier may include codeblocks at different ModCods. For example, the gateway transmitter may multiplex QPSK 3/4, 8PSK 3/4 and 8PSK 9/10 code blocks onto the same transmit carrier, if those are the ModCods determined to be appropriate for the intended receiving terminals for the packets contained within those code blocks. In implementations, the gateway may use a more robust ModCod than had been determined for a given receiving terminal, if that allows more efficient packing of packets destined to multiple receiving terminals into a single code block. In case of multicast traffic, i.e., data packets intended for multiple receiving terminals, the gateway may use a default ModCod, or may use the most robust ModCod required by any of the intended receiving terminals.

In example system 500, the traffic and control processing module 550 of gateway 510 maintains a database 545 that tracks the latest ModCod requested by each terminal. During operation, the database may be updated with each terminal ModCod request, and the appropriate ModCod entry for each packet to be sent to a terminal may be looked up prior to transmission.

In this implementation, the TX MAC/SLC 523 of gateway 510 may also organize code rates to schedule packets destined to the different terminals in to required code blocks. For example, packets or parts of packets to different terminals may be fitted into the same code block if the requested ModCods are consistent, or to fill out free space in a more robust code block. The RX PHY 122 and RX MAC/SLC 524 of gateway 510 may receive carriers (e.g., continuous or time division multiple access (TDMA) bursts) from the multiple terminals, and measure receive quality metrics to be returned to each respective terminal so that the terminal may control its own transmit ModCods.

Figure 6:
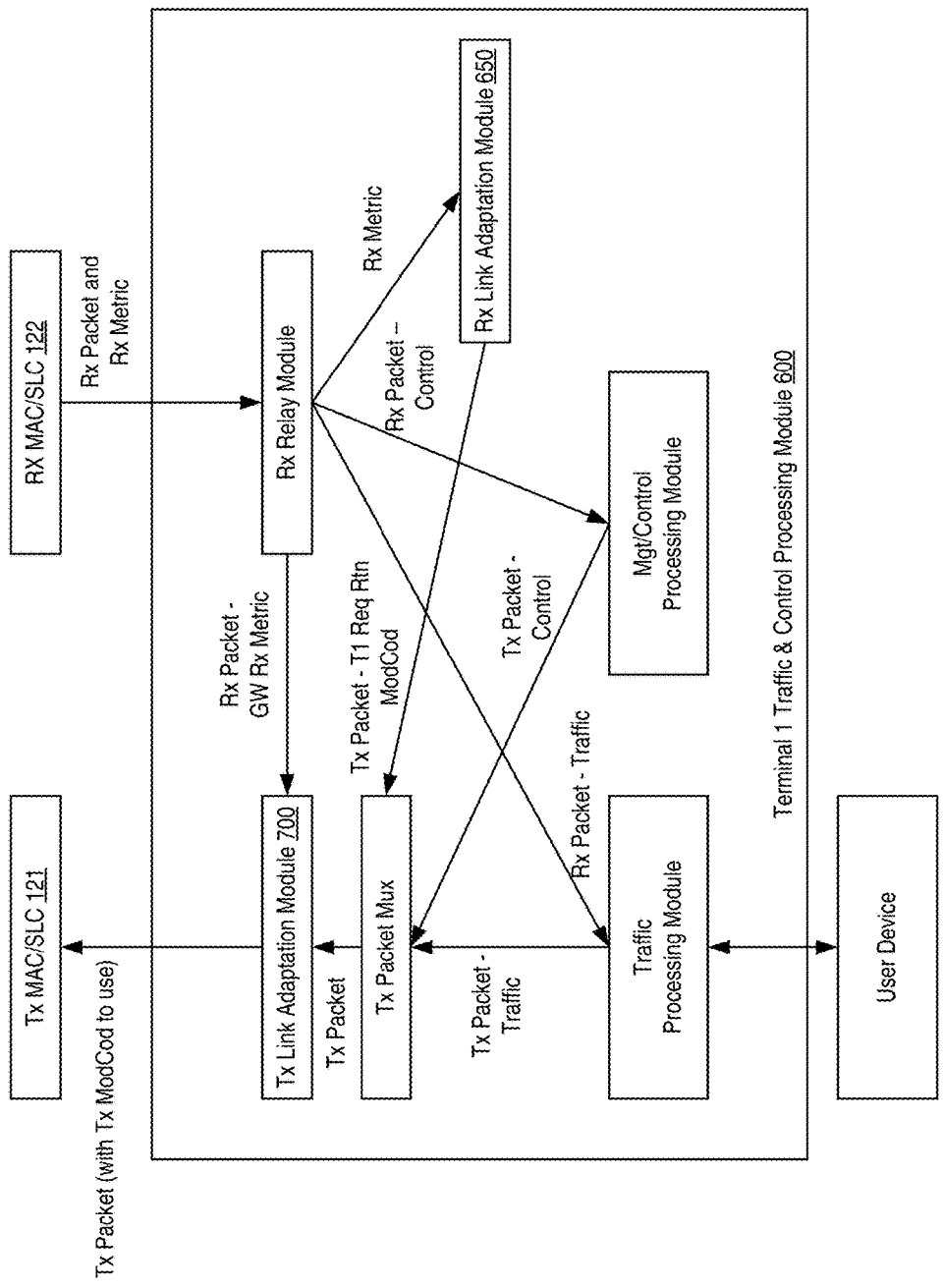
FIG. 6 is a block diagram illustrating an example operation of a traffic and control processing module for a terminal of the transponded satellite system of FIG. 5.

FIG. 6 is a block diagram illustrating an example operation of a traffic and control processing module 600 for a terminal (e.g., terminal 520 or 530) of transponded satellite system 500. In this implementation, rather than a peer terminal requesting a ModCod to be used by the terminal for its transmission, gateway 510 sends a receive quality metric, and Tx link adaptation module 700 determines, based on the quality metric received from the gateway, at which ModCod to transmit. Additionally, similar to receive link adaptation module 300, receive link adaptation module 650 determines ModCod transitions and triggers ModCod requests. Accordingly, as illustrated below, each terminal has ACM trajectory tables to control both the forward (gateway to terminal) and return (terminal to gateway) ACM operation.

Figure 7:
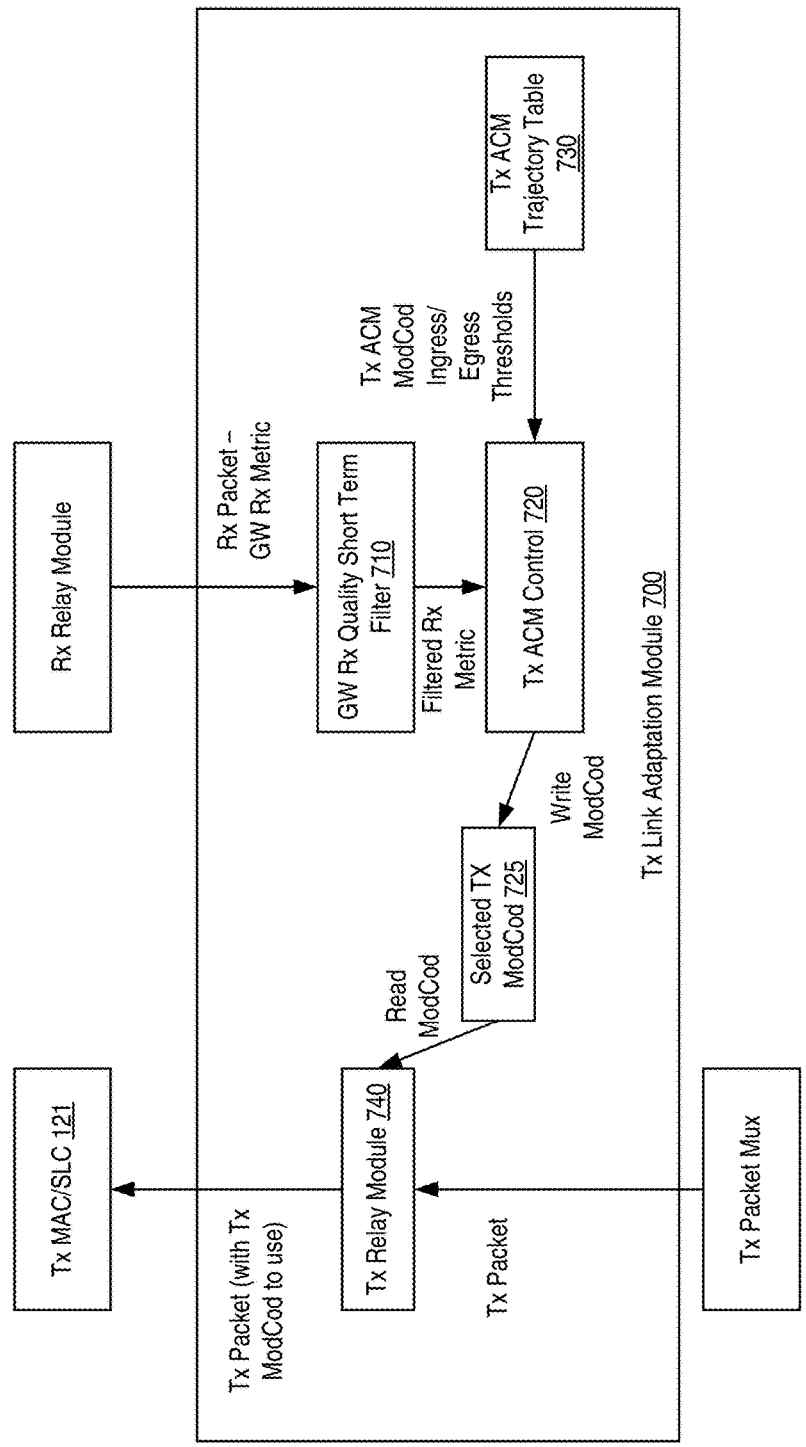
FIG. 7 is a block diagram illustrating an example operation of a transmitter link adaptation module that determines, based on a quality metric received from a gateway, at which ModCod to encode and transmit packets to the gateway.

FIG. 7 is a block diagram illustrating an example operation of transmitter link adaptation module 700 that determines, based on a quality metric received from a gateway, at which ModCod to encode and transmit packets to the gateway. As illustrated, transmitter link adaptation module 700 may comprise a gateway receiver quality short term filter 710, a transmitter ACM control 720, a transmitter ACM trajectory table 730, and a transmitter relay module 740. During operation, transmitter ACM trajectory table 730 is used by transmitter ACM control 720 to determine at which ModCod packets are encoded in the gateway. After a transmit ModCod 725 is selected, transmit relay module 740 indicates the selected ModCod 725 with each packet sent to Tx MAC/SLC 121.

Figure 8:
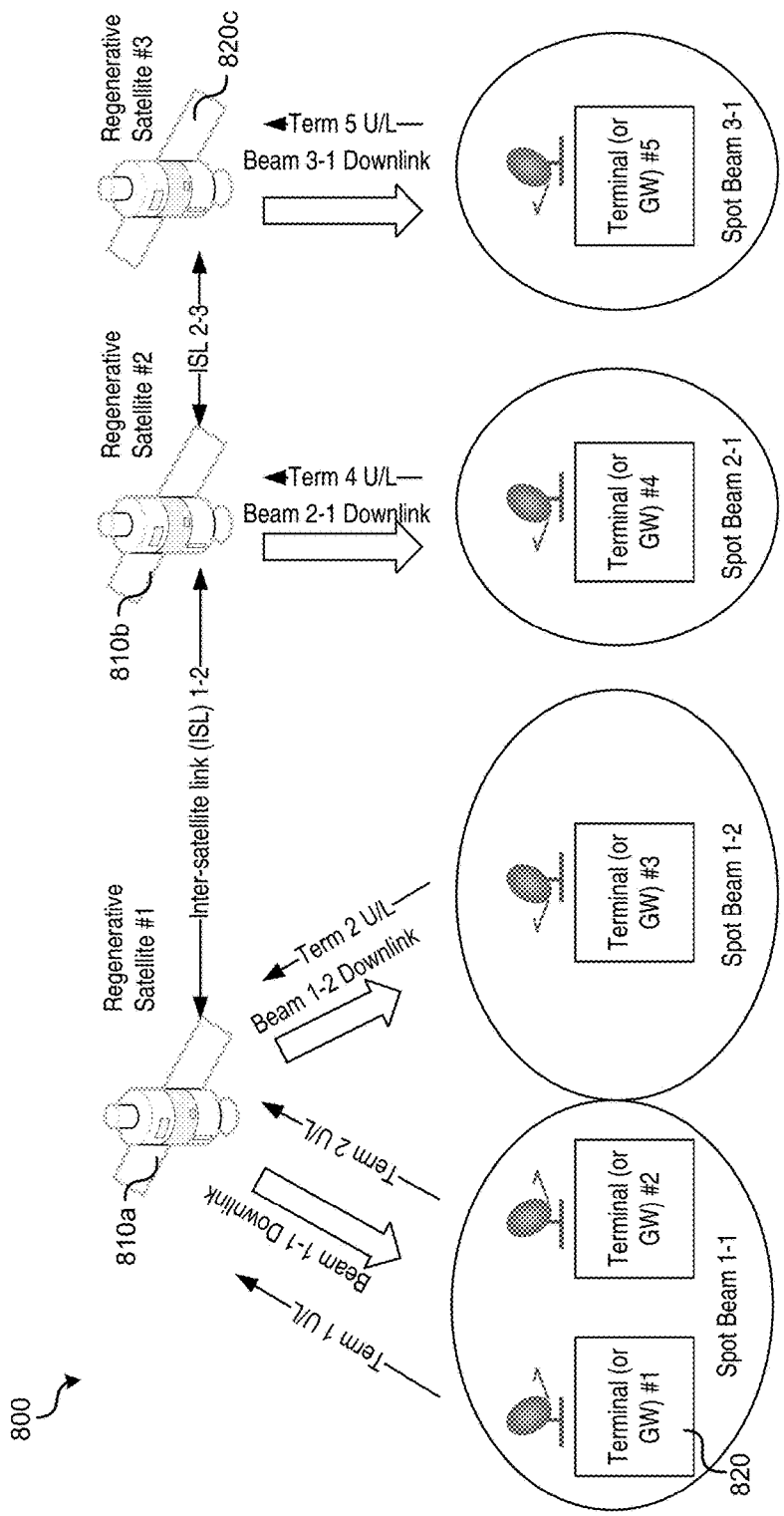
FIG. 8 illustrates a multi-satellite regenerative satellite system in accordance with the technology disclosed herein.

FIG. 8 illustrates a multi-satellite regenerative satellite system 800 in accordance with the present disclosure. In example system 800, regenerative satellites 810a-810c may provide one or more spot beams to terminals 820 on the downlink, and receive communications from terminals 820 on the uplink. As will be further described below, each regenerative satellite 810a-810c may demodulate and decode uplink carriers to extract conveyed data packets according to some uplink waveform, route those packets to downlink spot beams or through inter-satellite links, and modulate and encode downlink packets according to some downlink waveform. Additionally, as will be further described below, ACM may be provided on the uplink to and downlink from regenerative satellites 810a-810c.

Terminals 820 may comprise a very small aperture terminal (VSAT), a gateway, a hub, or an earth station. For example, terminals 820 can be VSATs and may connect to the Internet through satellites 810a-810c. A terminal may be used at a residence or place of business to provide a user with access to the Internet. VSATs or Mobile Satellite Terminals (MSTs), may be used by users to access the satellite network, and may include a remote satellite dish for receiving RF signals from and transmitting RF signals to satellites 810-810c, as well as a satellite modem and other equipment for managing the sending and receiving of data. They may also include one or more remote hosts, which may be computer systems or other electronic devices capable of network communications at a site.

Regenerative satellites 810a-810c may be placed in a geosynchronous earth orbit (GEO), low earth orbit (LEO), elliptical orbit, or some other configuration. The satellites may operate in the Ka-band, Ku-band, C-band or other suitable band. Signals passing through satellites 810a-810c may be based, for example, on the DVB-S2 standard (ETSI EN 302 307) using signal constellations up to and including at least 32-APSK, or on the Internet Protocol over Satellite (IPoS) standard (ETSI TS 102 354), or on other standard or proprietary specifications incorporating ACM. Other suitable signal types may also be used, including, for example higher data rate variations of DVB-S2, or DVB-S2 extensions or adaptations sometimes designated as DVB-S2X. Also illustrated by FIG. 8 are inter-satellite links (ISLs) between regenerative satellites 810a-810c. As will further described below, ACM control may be applied end-to-end across multiple ISLs.

Figure 9:
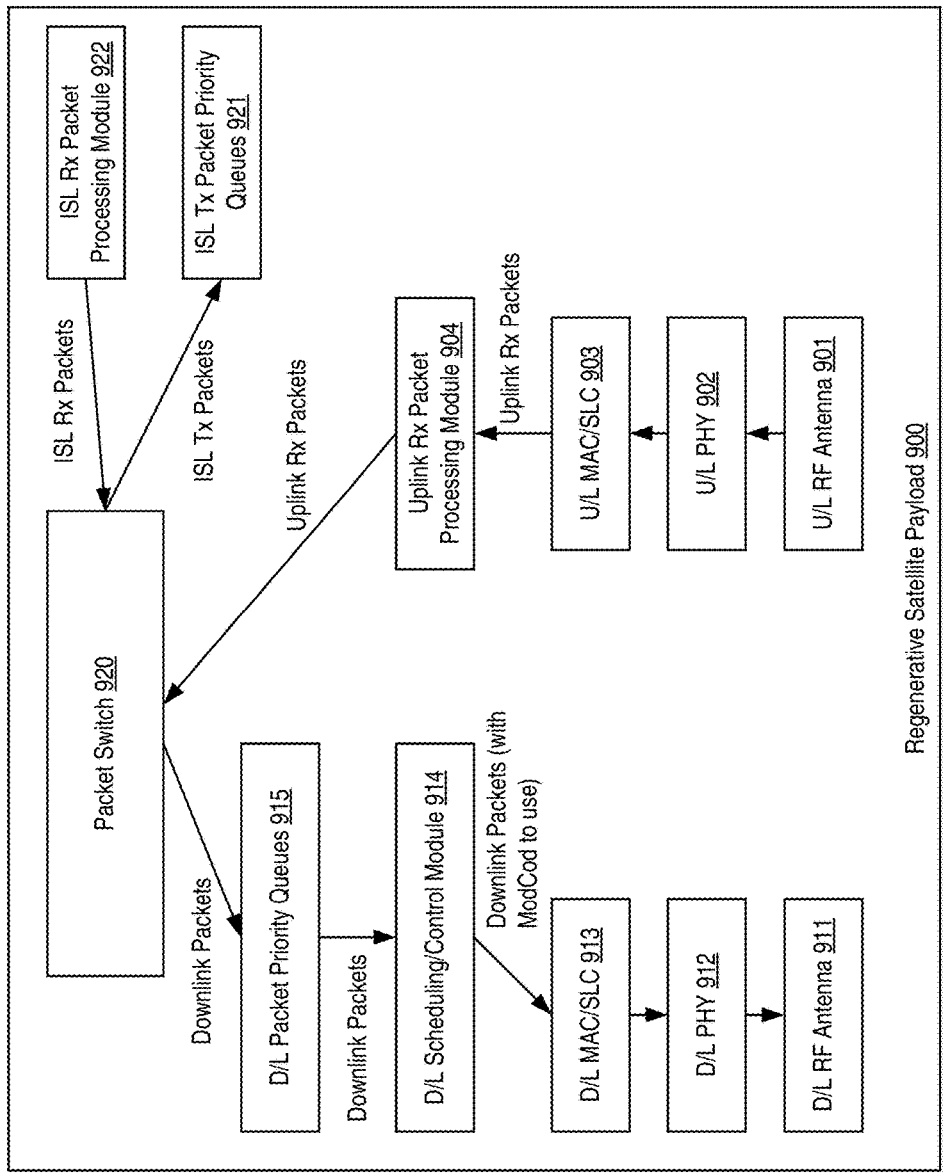
FIG. 9 illustrates an example payload of a regenerative satellite of FIG. 8 in accordance with embodiments of the technology disclosed herein.

FIG. 9 illustrates an example payload 900 for a regenerative satellite 810a-810c in accordance with embodiments of the technology disclosed herein. FIG. 9 illustrates certain functional blocks that are relevant to the disclosed technology, but it should be noted that a given payload may include many other functional blocks, and the realization of the illustrated functions by specific hardware modules is not implied in this diagram. It should also be noted that one of ordinary skill in the art will understand that one or more of the components of regenerative satellite payload 900 may be implemented in digital form (e.g., as software running on a DSP or other processing device, with the addition of a DAC). In addition, certain components may be implemented in analog form (e.g., RF antenna).

On the uplink/receiver side, payload 900 may comprise an uplink (U/L) RF antenna 901 for receiving an uplink waveform, an U/L PHY 902, an U/L MAC/SLC 903, and an U/L packet processing module 904. U/L PHY 902 may perform functions such as RF filtering, demodulation, deinterleaving, and decoding, and U/L MAC/SLC 903 may perform functions such as packet reassembly and decryption.

On the downlink/transmitter side, payload 900 may comprise downlink (D/L) packet priority queues 915, D/L scheduling/control module 914, DL MAC/SLC 913, D/L PHY 912, and D/L RF antenna 911 for transmitting a downlink waveform. D/L PHY 912 may perform functions such as encoding, interleaving, modulation, and filtering, and D/L MAC/SLC 913 may perform functions such as scheduling, packet segmentation, and encryption.

Packet switch 920 may route packets received from other satellites over ISLs and packets received over an uplink. For example, packets may be received from other satellites using ISL Rx packet processing module 922, and packet switch 920 may determine (e.g., based on a destination field in the packet header) whether to transmit these packets on the downlink or to route these packets to another satellite along an ISL. If packets are routed to other satellites, they may be placed in ISL Tx packet priority queues 921 in preparation for transmission to other satellites.

ACM on Uplink of Regenerative Satellite Communication System

As noted above, ACM may be provided on the uplink from regenerative satellites 810a-810c. In one implementation of ACM on the uplink, the regenerative satellite might perform functions analogous to what a receiving terminal performs in a transponded satellite system implementing ACM (described above with reference to FIGS. 1-7), measuring receive signal metrics and conveying either those metrics or an appropriate ModCod to the transmitting terminal or control system. The transmitting terminal would thereby adapt its transmit ModCod according to the metrics or ModCod signaled by the satellite or control system. Either of these methods may place a significant burden on the satellite over and above providing a flexible demodulator capable of receiving the uplink ACM waveform. The satellite would have to measure and associate particular signal metrics with particular transmitting terminals, and generate downlink signals to convey each appropriate metric or ModCod to each appropriate terminal, or else convey such metrics to some control system. The satellite would have to perform these functions at a rate consistent with uplink throughput, possibly requiring implementation of custom application specific integrated circuits (ASICs) for processing speed. In order to reduce the downlink capacity overhead required to convey ACM signaling, the satellite might keep track of what feedback it last signaled to each transmitting terminal, and generate downlink ACM signaling only in case of significant change, but this would require the satellite to keep track of terminals and implement further control logic. An architecture placing such complexity in space involves significant implementation cost, risk, and difficulty to make changes to correct or improve algorithms after the satellite is launched. Consequently, a simpler alternative is desirable.

Figure 10:
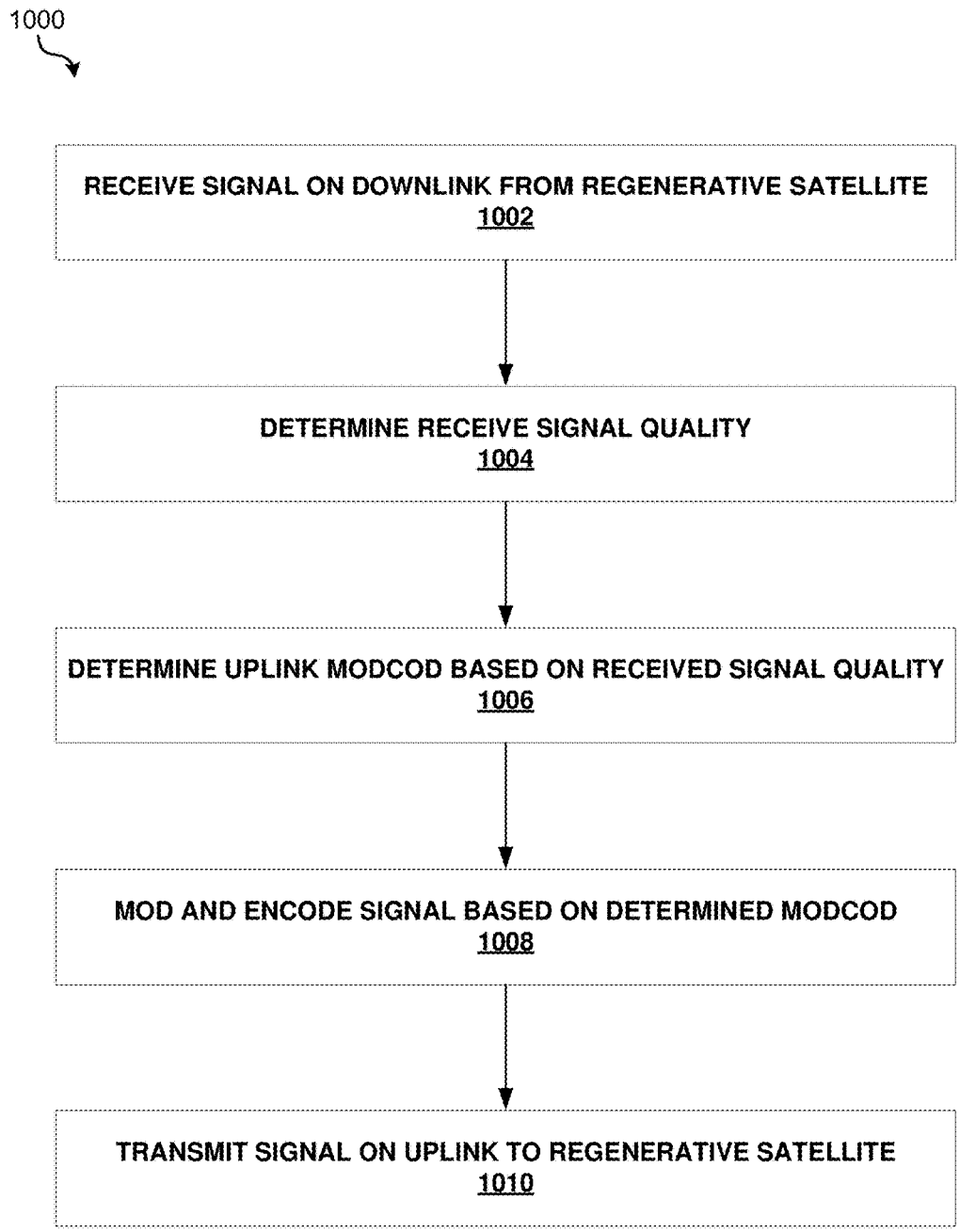
FIG. 10 is an operational flow diagram illustrating an example method that may be implemented to provide ACM on the uplink from a terminal to a satellite in a regenerative satellite communication system.

FIG. 10 is an operational flow diagram illustrating an example method 1000 that may be implemented by a terminal to provide one such alternative to implementing ACM on the uplink from a terminal to a satellite in a regenerative satellite communication system 800. In method 1000, further described below, the uplink ModCod may be estimated based on a received signal quality. This simplified uplink ModCod determination may be viable because the downlink and uplink between a given terminal and a given regenerative satellite go through the same propagation path and weather.

At operation 1002, a terminal 820 receives a signal on a downlink from a regenerative satellite 810a-810c. At operation 1004, the quality of the received signal is determined. For example, the $E_s N_0$ of the received signal may be measured and passed through a short-term filter to provide hysteresis to smooth out transient variations.

At operation 1006, an uplink ModCod is determined based on the received signal quality. In embodiments, the uplink ModCod may be determined based on a mapping that accounts for differences between the uplink and downlink propagation paths, including factors such as, for example, satellite and terminal antenna performance and power amplifier size, operation of power control algorithms, differences between the uplink and downlink waveforms, effective satellite downlink power, calibration measurement points, and other factors. This mapping may be provided as a table mapping a given receive signal quality metric (e.g., a received $E_s N_0$) to a desired downlink receive ModCod and also to a similar or different desired uplink transmit ModCod, as appropriate for the relationship of expected downlink and uplink propagation performance. This mapping table may be an extension of the exemplary table in FIG. 4, with the indicated entry and exit threshold values mapped to separate receive and transmit ModCods. The relationship of downlink and uplink propagation performance may be determined according to knowledge of satellite and terminal configuration and performance, differences between respective uplink and downlink waveforms, or other factors, including local calibration processes executed during installation or on some other basis.

In one embodiment, the terminal may be configured with downlink and uplink ACM control tables, such that when the terminal receive signal quality maps in the downlink ACM control table to use of a downlink ModCod (e.g., QPSK 3/4), the signal quality maps in the uplink ACM control table to use of an uplink ModCod (e.g., QPSK 1/2). In implementations of this embodiment, the same ModCod may or may not be used on the uplink and downlink, depending on the differences between the uplink and downlink conditions noted above. It should also be noted that the same waveform may or may not be used on the uplink and downlink.

At operation 1008, prior to uplink transmission, the terminal encodes and modulates signals based on the determined ModCod. In implementations, the determination of the ModCod may adjust the current modulation scheme and/or FEC rate applied to signals transmitted on the uplink. At operation 1010, a signal, encoded and modulated with the determined ModCod, is transmitted on the uplink to the regenerative satellite.

The disclosed uplink ACM method 1000 may provide a number of benefits. The regenerative satellite would not have to measure or provide signal quality feedback to transmitting terminals. The satellite would not be required to keep track of specific terminals or convey specific metrics to specific terminals. Downlink capacity would not be consumed to convey uplink signal metrics or ModCods. The satellite would require less complex logic, and be less susceptible to risk of logic errors being detected after launch. The satellite might also require less hardware and consequently have lower mass and power requirements. Additionally, in case of a LEO or elliptical orbit regenerative satellite constellation, the transmitting terminal may automatically update its uplink ModCod in case of transition to a different satellite, upon measuring one or more receive signal quality metrics associated with downlink transmission received from the new satellite.

ACM on Downlink of Regenerative Satellite Communication System

As noted above, ACM may be provided on the downlink from regenerative satellites 810a-810c. In one implementation of ACM on the downlink, the regenerative satellite may perform functions analogous to what a transmitting terminal performs in a transponded satellite system implementing ACM (described above with reference to FIGS. 1-7), maintaining a mapping of specific ModCods to specific terminals, changing that mapping as new downlink receive quality metrics or ModCods are signaled for those terminals, adapting the transmit waveform for each given packet according to the ModCod determined for the terminal or terminals to which that traffic is destined, and using a default robust ModCod in case a mapping is not available or is stale. This may involve significant complexity, risk, and added hardware or software on the satellite over and above providing a flexible modulator capable of transmitting a downlink ACM waveform. The satellite would have to be configured with or learn to maintain a database of terminals, keep track of their associated ModCods, be capable to process terminal ACM feedback signaling to update the ModCod mapping database, and look up terminals in the mapping database in real-time to identify the ModCod to be used for specific traffic. If required to optimize the ModCod for a downlink multicast transmission according to the intended receive terminals, the satellite would be required to know which terminals are intended to receive the multicast data and to find in its mapping database the worst case ModCod required by any of those recipients. As noted above for uplink ACM, placing such complexity and cost in a satellite might be unsuitable, and an alternative may be desired.

Figure 11:
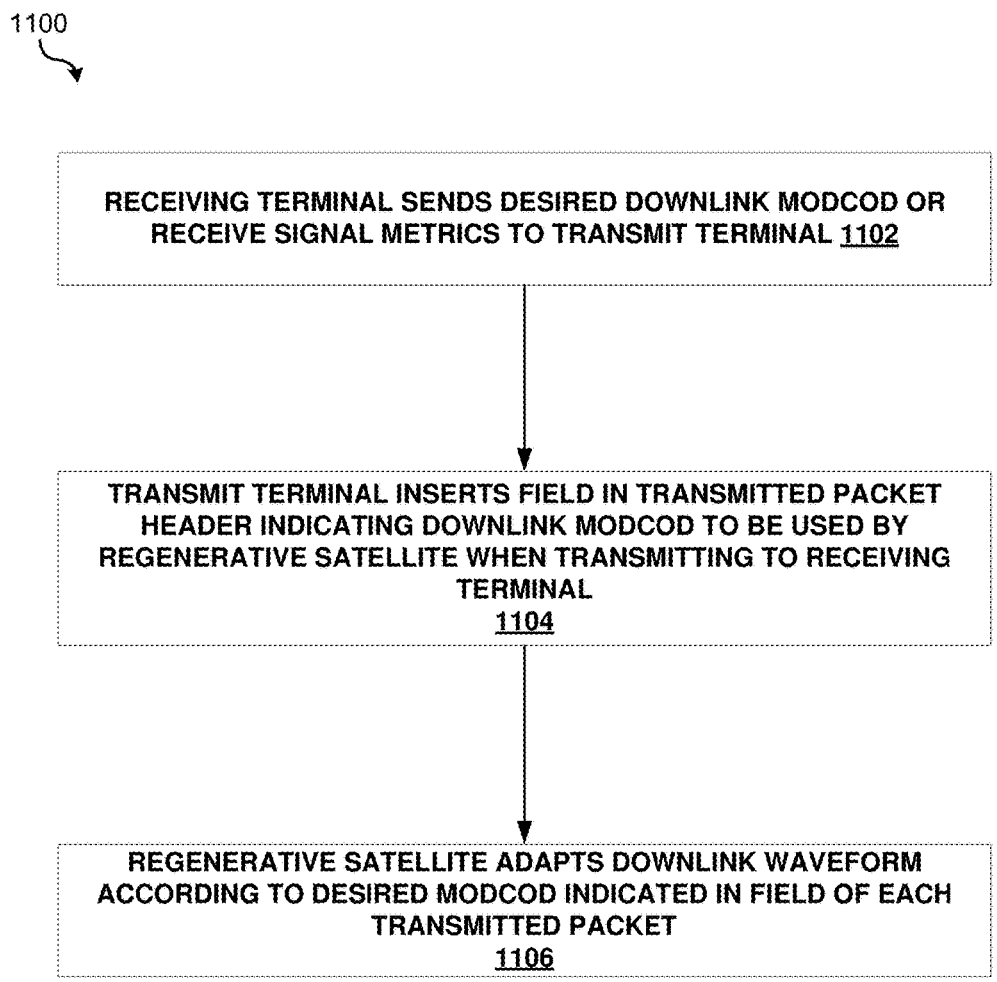
FIG. 11 is an operational flow diagram illustrating an example method that may be implemented to provide ACM on the downlink from a satellite to a terminal in a regenerative satellite communication system.

FIG. 11 is an operational flow diagram illustrating an example method 1100 that provides one such alternative to implementing ACM on the downlink in a regenerative satellite communication system 800. At operation 1102, a receiving terminal transmits one or more receive signal metrics or a desired downlink ModCod to a transmitting terminal from which the receiving terminal's receive packets originated over a regenerative satellite communication system. For example, the receiving terminal may send a QPSK 3/4 ModCod request to a terminal which had transmitted on its uplink the received downlink packet. Alternatively, for example, the terminal may send a filtered receive $E_sN_0$ value to a terminal which had transmitted on its uplink the received downlink packet, and such transmitting terminal may then map that $E_sN_0$ value to a QPSK 3/4 ModCod value. Alternatively, the receiving terminal may send a filtered signal metric, for example, $E_sN_0$ having been passed through a short term filter so as to smooth out transient variations, and the transmitting terminal may determine an appropriate downlink ModCod for the receiving terminal based on the received signal metric.

At operation 1104, in response to receiving the downlink ModCod (or determining the ModCod based on the received signal metrics), the transmitting terminal inserts into each transmitted packet header a field indicating the downlink ModCod to be used by a regenerative satellite when transmitting on the downlink to the receiving terminal. For example, the transmitting terminal may embed a QPSK 3/4 request within each subsequent uplink packet destined to that same receiving terminal. In embodiments, the transmitting terminal may maintain and update a table of downlink ModCod mapping for each receiving terminal that it transmits packets to. In other words, the table would be updated each time the transmitting terminal receives a request for a new downlink ModCod from a receiving terminal. In implementations where the regenerative satellite system includes ISLs, the field indicating the downlink ModCod may be used only by a last hop satellite (i.e., the regenerative satellite that transmits to the receiving terminal).

Figure 12:
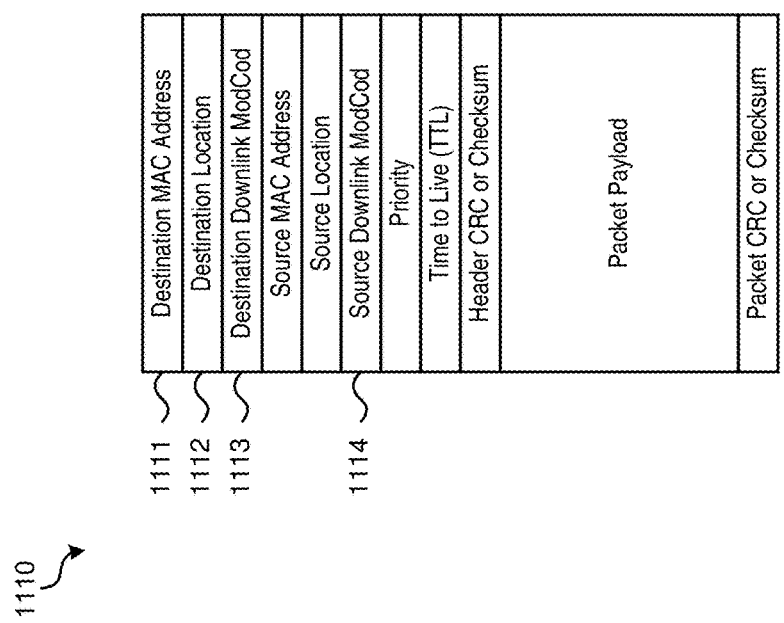
FIG. 12 illustrates an example packet header enabling end-end downlink ACM control of ModCod selection for a regenerative satellite communication system.

FIG. 12 illustrates an example packet header enabling end-end downlink ACM control of ModCod selection for a regenerative satellite communication system. As illustrated, the packet header may include, among other fields, a destination MAC address 1111 indicating to which terminal or terminals the packet is destined, a destination location 1112 indicating where the destined terminal is for routing purposes (e.g., location of a ground spot beam), a destination downlink ModCod 1113 indicating a ModCod to be used by a last hop satellite for packet transmission, and a source downlink ModCod 1114 (e.g., if the transmitting terminal informs the receiving terminal of its return ModCod request using a transmitted packet). Other fields in the packet header may include a source MAC address (e.g., which terminal sent the packet), a source location, a packet priority or drop class in case of downlink or ISL congestion, a time to live (TTL), a header checksum, a packet checksum, and the packet payload.

At operation 1106 a regenerative satellite adapts the downlink waveform according to the desired ModCod as indicated in each packet to be transmitted to the destination terminal. For example, the satellite could extract and use an indicated QPSK 3/4 ModCod to regenerate a subsequent packet into the destination terminal downlink. As shown by the example of FIG. 9, D/L scheduling and control module 914 may extract the ModCod from the packet header and provide it to D/L MAC/SLC 913 for use in code block construction and for encoding and modulation by D/L PHY 912.

In implementations where a given receiving terminal receives data originating from multiple transmitting terminals, method 1100 may be repeated for each transmitting terminal. The receiving terminal may transmit its desired ModCod (or receive signal metrics) to each such transmitting terminal, and each such transmitting terminal may embed the ModCod request within each packet destined to the receiving terminal, such that the regenerative satellite uses the intended ModCod for downlink transmissions to the receiving terminal.

By way of example, with reference to FIG. 8, if terminal 1 is in communication with terminals 2, 3, 4, and 5, it may signal to each of those terminals what ModCod to indicate in the headers of packets destined to terminal 1, and when being sent by regenerative satellite 1 that indicated ModCod would be used. Conversely, terminal 1 would similarly receive from terminals 2, 3, 4, and 5 the ModCods to be used for transmissions respectively to each of them. Terminal 1 could maintain a table of ModCod mapping for terminals 2, 3, 4, and 5, and use the correct ModCod for each destination.

The disclosed downlink ACM method 1100 may provide a number of benefits. The satellite would not have to maintain a database of terminals and requested ModCods, and would not have to update the database based on ACM signaling. The satellite would require less complex logic, and be less susceptible to risk of logic errors being detected after launch. The satellite may also require less hardware and consequently have lower mass and power requirements.

In one embodiment, determination of the downlink ModCod most appropriate for a receiving terminal may account for satellite movement (e.g., in the case of regenerative LEO or elliptical satellite constellations). As the satellite moves and the distance to the terminal decreases or increases, the satellite downlink may pass through different weather, and the terminal may transition across a satellite downlink spot beam and to another spot beam. The downlink ModCod adaptation may track these changes so long as the rate or schedule of ACM feedback from the receiving terminal to the regenerative satellite or to the transmitting terminal or control system is sufficient. As a high feedback rate may consume capacity that could otherwise be used for traffic, the feedback rate may be reduced based on factors such as, for example, the receiving terminal location, satellite beam pattern, satellite ephemeris, or some combination thereof.

In another embodiment, determination of the downlink ModCod most appropriate for a receiving terminal may account for the terminal transitioning from one satellite to another (e.g., in the case of regenerative LEO or elliptical satellite constellations). During satellite transition, even if the terminal elevation angle to the arriving satellite is similar to the elevation angle for the departing satellite, the downlink propagation path may pass through different weather and experience different attenuation. In response, the downlink ModCod may be adapted to a robust ModCod upon transition. In implementations, satellite transitions may be anticipated based on knowledge of the terminal location and satellite ephemeris, and a switch to a robust ModCod may be made just prior to transition to the new satellite, thereby minimizing the risk of packet loss. This may be achieved by the receiving terminal signaling a ModCod change or transition event to each applicable transmitting terminal, a control system, or to the regenerative satellite as appropriate, prior to changing to a new satellite.

Figure 13:
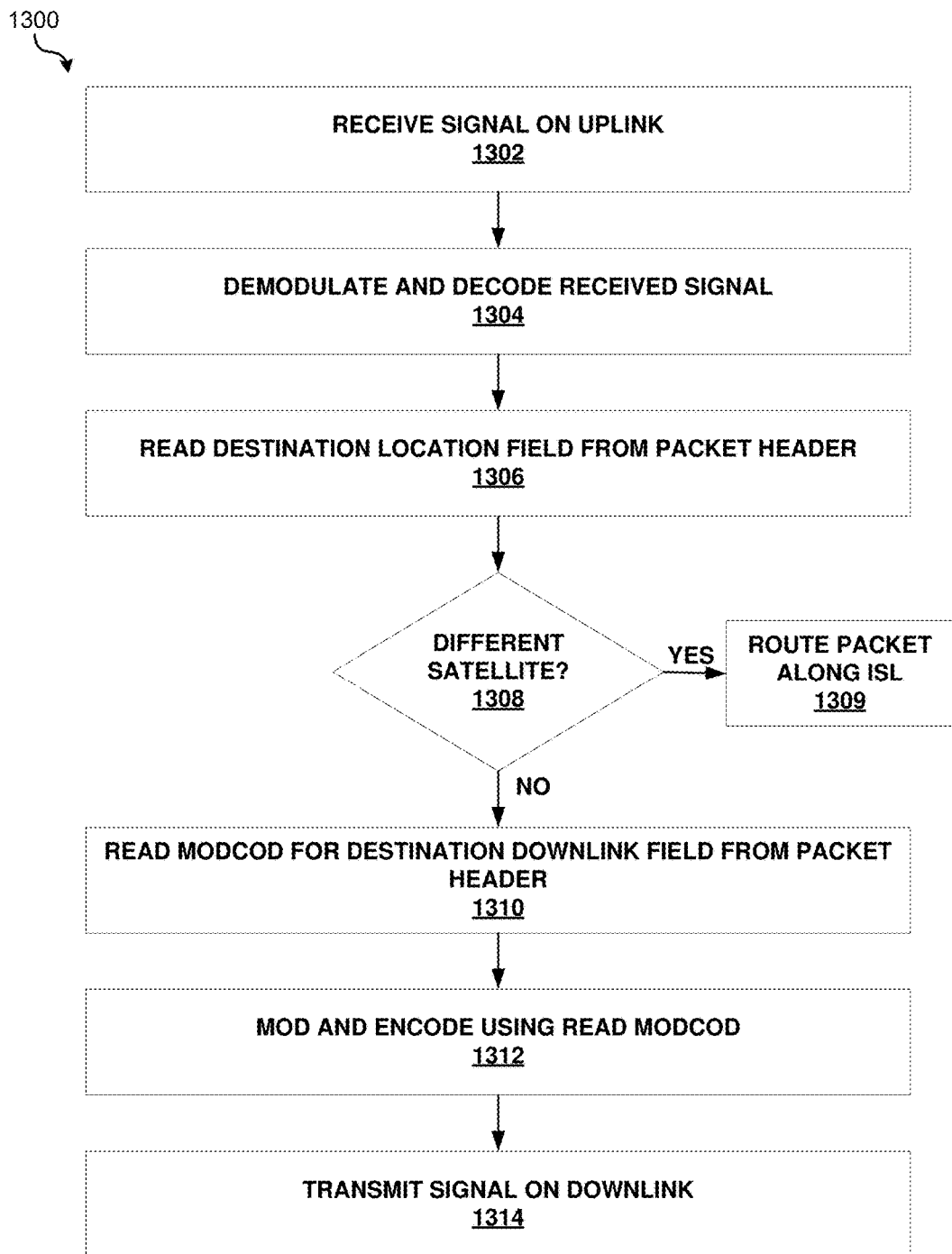
FIG. 13 is an operational flow diagram illustrating an example method that may be implemented by a regenerative satellite to provide ACM on the downlink.

FIG. 13 is an operational flow diagram illustrating an example method 1300 that may be implemented by a regenerative satellite to provide ACM on the downlink. Method 1300 will be described in conjunction with example regenerative satellite payload 900. At operation 1302, the regenerative satellite receives a signal on the uplink. The signal may be received at RF antenna 901, filtered using a receiver filter (e.g., an RF filter), and downconverted. At operation 1304, the received signal is demodulated and decoded. For example, depending on the modulation and coding of the received signal, the received signal may be demodulated and decoded at U/L PHY 902 using any one of FEC codes 1/2, 2/3, 3/4, 5/6, 7/8, 8/9, 9/10, etc., and any one of modulations formats of Amplitude Phase Shift Keying (APSK), Quadrature Phase Shift Keying (QPSK), $\pi$/M-MPSK, other orders of Multiple Phase Shift Keying MPSK, Quadrature Amplitude Modulation (QAM), etc.

At operation 1306 a destination location field is read from a header of a packet of the demodulated and decoded signal. The destination location field, in various embodiments, may provide an indication of the final satellite that will transmit the packet to the receiving terminal. For example, the destination location field may indicate a location of a ground spot beam corresponding to the receiving terminal. At decision 1308, it is determined if the packet needs to be routed to a different satellite based on the destination location field. If so, at operation 1309, the packet may be routed along an ISL to another regenerative satellite.

If the final satellite that will transmit the packet to the receiving terminal is the current regenerative satellite, at operation 1310 the regenerative satellite reads from the packet header a field indicating the downlink ModCod to be used when transmitting on the downlink to the receiving terminal. After reading the ModCod, at operation 1312 the regenerative satellite encodes and modulates the downlink packet (e.g., using D/L PHY 912) according to the desired ModCod as indicated in the packet, and the downlink signal is transmitted at operation 1314.

Figure 14:
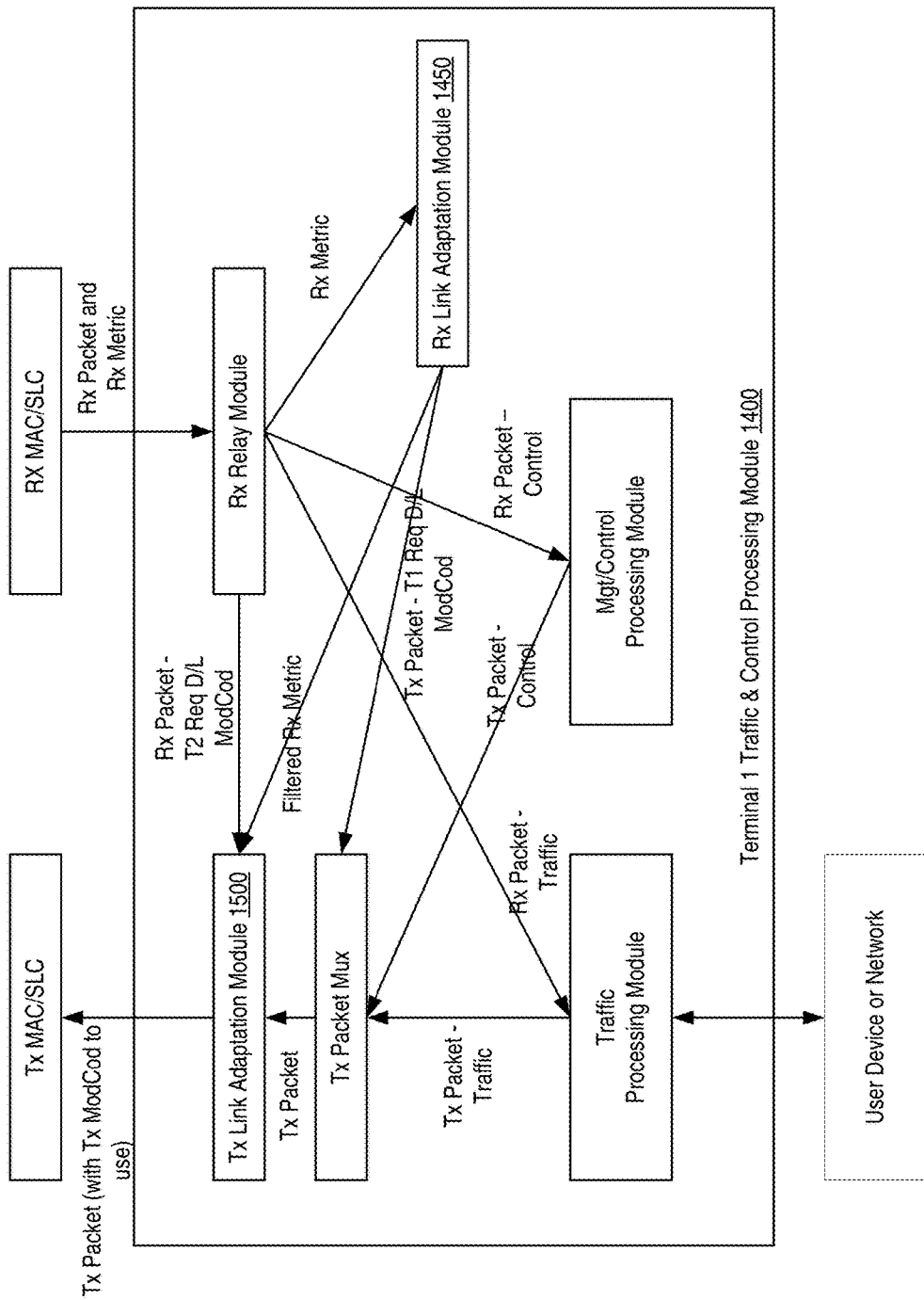
FIG. 14 is a block diagram illustrating an example operation of a traffic and control processing module for a terminal of the regenerative satellite system of FIG. 8.

FIG. 14 is a block diagram illustrating an example operation of a traffic and control processing module 1400 for a terminal of the regenerative satellite system of FIG. 8. As shown, the receiver relay forwards to transmit link adaptation module 1500 the downlink ModCod requests received from other terminals (e.g., terminal 2 in the example of FIG. 14). As further described below, transmit link adaptation module 1500 places these ModCod requests in headers of packets it transmits to that terminal over a regenerative satellite network, so that the last hop regenerative satellite knows what ModCod to use.

As described above with respect to FIG. 3, receiver link adaptation module 1450 may run a short-term filter and decide what ModCod it would like to receive based on a Rx ACM Trajectory Table. It may send that request to a Tx Packet Mux to be sent to every destination terminal with which the terminal is in communication such that those terminals may identify the correct downlink ModCod in the headers of packets transmitted to the terminal. As mentioned above, this can be sent in separate packets to those terminals, or as part of a transmit packet (e.g., field 1114 of FIG. 12). Module 1450 may also send the receive quality metric, having passed through the short term filter, to the Tx link adaptation module so that it can do the open loop uplink ACM ModCod control/selection.

Figure 15:
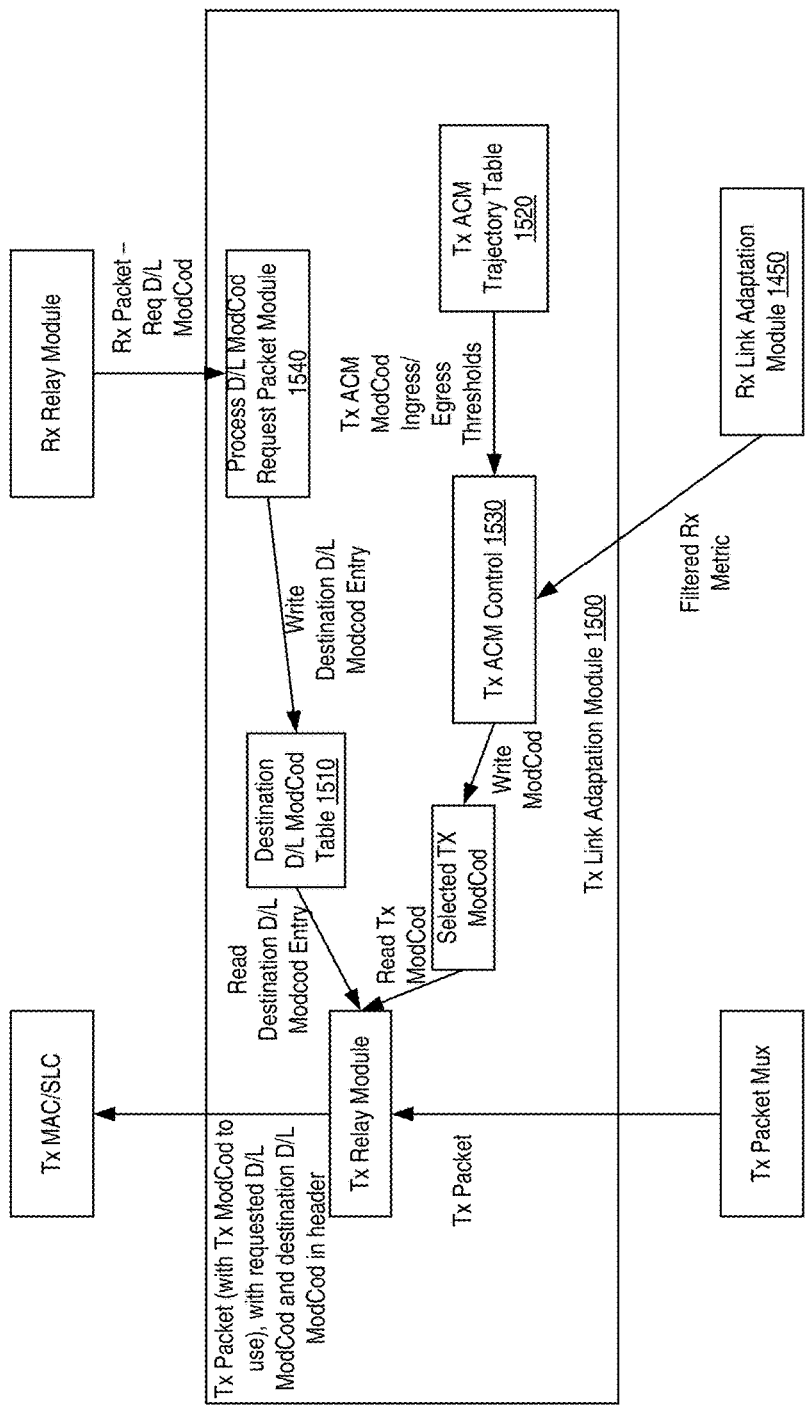
FIG. 15 is a block diagram illustrating an example operation of a transmitter link adaptation module of a terminal of the regenerative satellite system of FIG. 8.

FIG. 15 is a block diagram illustrating an example operation of a transmitter link adaptation module 1500 of a terminal of the regenerative satellite system of FIG. 8. During operation, Tx ACM control module 1530 uses the filtered Rx metrics and Tx ACM trajectory table 1520 to determine what ModCod to use for transmissions on the uplink, which is indicated by the Tx relay to the Tx MAC/SLC.

Process D/L ModCod request packet module 1540 receives the ModCod requested by a receiving/destination terminal, and saves the ModCod information into destination downlink ModCod Table 1510 such that the Tx Relay may include it in the packet header for any packet sent to that destination terminal, to be acted on by the last hop regenerative satellite when it transmits the packet on the downlink to the destination terminal. FIG. 16 illustrates one such example destination downlink ModCod table 1510 that may be implemented by transmitter link adaptation module 1500 to provide end-to-end control of downlink ModCod. For instance, with reference to the regenerative satellite system of FIG. 8, table 1510 could be the destination downlink ModCod table of terminal 1.

In embodiments, the disclosed systems and methods for uplink and downlink ACM may be used in a communication system using regenerative high altitude platforms such as aircrafts or balloons. Particularly, the regenerative high altitude platforms may be equipped with the hardware and software modules described above with reference to regenerative satellites 810a-810c. Although the technical risk of an ACM implementation in a regenerative high altitude system is lower than for a regenerative satellite system because high altitude platforms can be landed and upgraded, these systems are likely to be very constrained as to mass, size and power, and the disclosed systems and methods could help address these constraints by placing less equipment and functionality on the high altitude platform.

Figure 17:
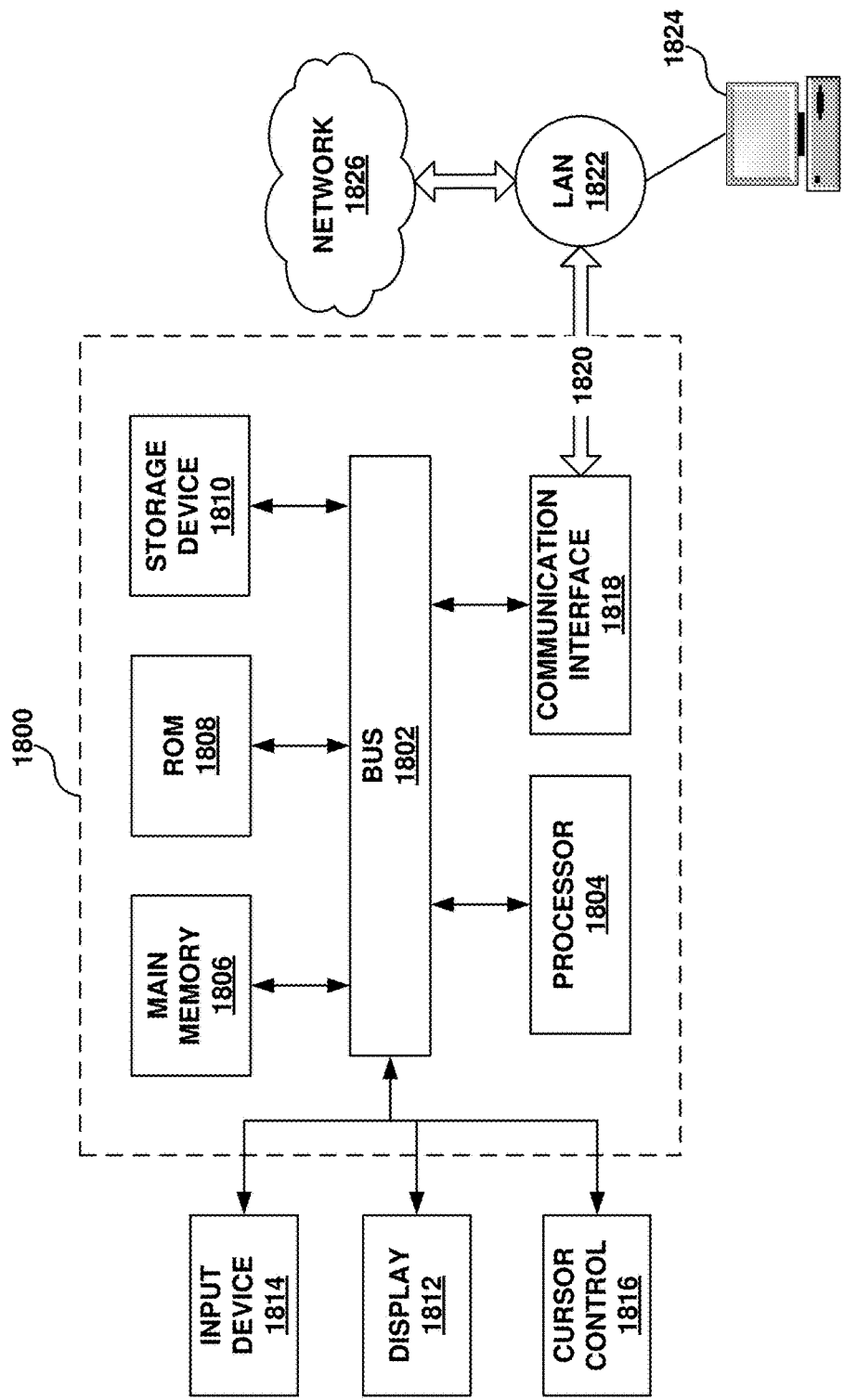
FIG. 17 illustrates an example computing module that may be used in implementing features of various embodiments.

FIG. 17 illustrates a computer system 1800 upon which example embodiments according to the present disclosure can be implemented. Computer system 1800 can include a bus 1802 or other communication mechanism for communicating information, and a processor 1804 coupled to bus 1802 for processing information. Computer system 1800 may also include main memory 1806, such as a random access memory (RAM) or other dynamic storage device, coupled to bus 1802 for storing information and instructions to be executed by processor 1804. Main memory 1806 can also be used for storing temporary variables or other intermediate information during execution of instructions to be executed by processor 1804. Computer system 1800 may further include a read only memory (ROM) 1808 or other static storage device coupled to bus 1802 for storing static information and instructions for processor 1804. A storage device 1810, such as a magnetic disk or optical disk, may additionally be coupled to bus 1802 for storing information and instructions.

Computer system 1800 can be coupled via bus 1802 to a display 1812, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1814, such as a keyboard including alphanumeric and other keys, may be coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812.

According to one embodiment of the disclosure, adaptive coding and modulation, in accordance with example embodiments, are provided by computer system 1800 in response to processor 1804 executing an arrangement of instructions contained in main memory 1806. Such instructions can be read into main memory 1806 from another computer-readable medium, such as storage device 1810. Execution of the arrangement of instructions contained in main memory 1806 causes processor 1804 to perform one or more processes described herein. One or more processors in a multi-processing arrangement may also be employed to execute the instructions contained in main memory 1806. In alternative embodiments, hard-wired circuitry is used in place of or in combination with software instructions to implement various embodiments. Thus, embodiments described in the present disclosure are not limited to any specific combination of hardware circuitry and software.

Computer system 1800 may also include a communication interface 1818 coupled to bus 1802. Communication interface 1818 can provide a two-way data communication coupling to a network link 1820 connected to a local network 1822. By way of example, communication interface 1818 may be a digital subscriber line (DSL) card or modem, an integrated services digital network (ISDN) card, a cable modem, or a telephone modem to provide a data communication connection to a corresponding type of telephone line. As another example, communication interface 1818 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1818 sends and receives electrical, electromagnetic, or optical signals that carry digital data streams representing various types of information. Further, communication interface 1818 may include peripheral interface devices, such as a Universal Serial Bus (USB) interface, a PCMCIA (Personal Computer Memory Card International Association) interface, etc.

Network link 1820 typically provides data communication through one or more networks to other data devices. By way of example, network link 1820 can provide a connection through local network 1822 to a host computer 1824, which has connectivity to a network 1826 (e.g. a wide area network (WAN) or the global packet data communication network now commonly referred to as the "Internet") or to data equipment operated by service provider. Local network 1822 and network 1826 may both use electrical, electromagnetic, or optical signals to convey information and instructions. The signals through the various networks and the signals on network link 1820 and through communication interface 1818, which communicate digital data with computer system 1800, are example forms of carrier waves bearing the information and instructions.

Computer system 1800 may send messages and receive data, including program code, through the network(s), network link 1820, and communication interface 1818. In the Internet example, a server (not shown) might transmit requested code belonging to an application program for implementing an embodiment of the present disclosure through network 1826, local network 1822 and communication interface 1818. Processor 1804 executes the transmitted code while being received and/or store the code in storage device 1810, or other non-volatile storage for later execution. In this manner, computer system 1800 obtains application code in the form of a carrier wave.

The term "computer-readable medium" as used herein refers to any medium that participates in providing instructions to processor 1804 for execution. Such a medium may take many forms, including but not limited to non-volatile media, volatile media, and transmission media. Non-volatile media include, for example, optical or magnetic disks, such as storage device 1810. Volatile media may include dynamic memory, such as main memory 1806. Transmission media may include coaxial cables, copper wire and fiber optics, including the wires that comprise bus 1802. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, solid state drive, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 18:
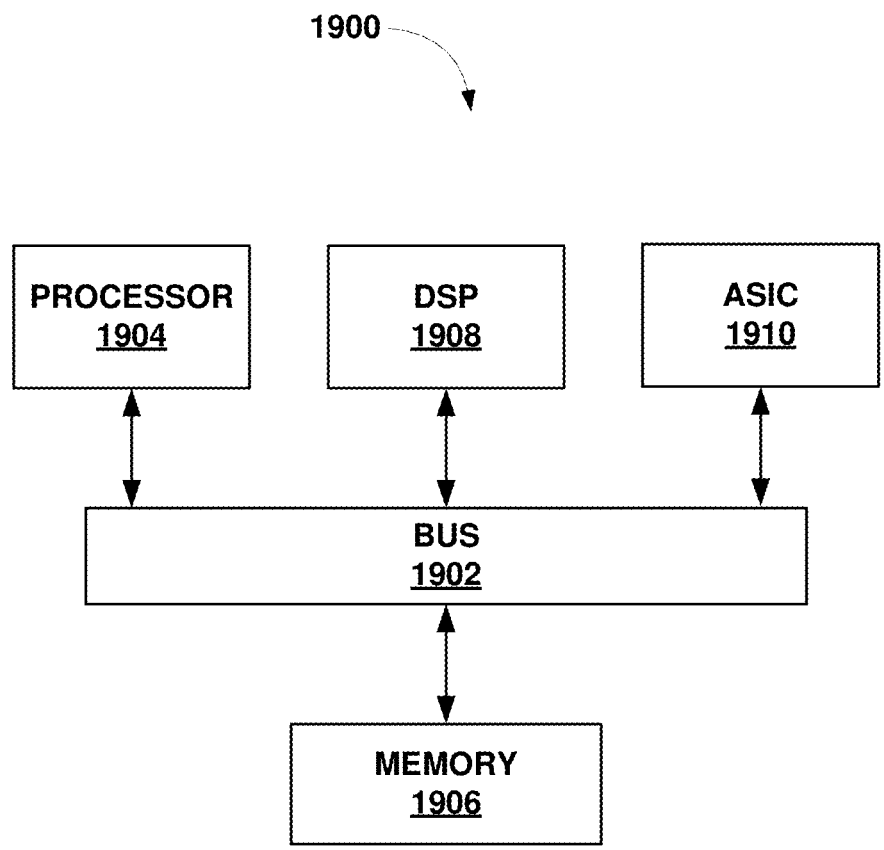
FIG. 18 illustrates an example chip set that can be utilized in implementing architectures and methods for dynamic bandwidth allocation in accordance with various embodiments.

FIG. 18 illustrates a chip set 1900 in which embodiments of the disclosure may be implemented. Chip set 1900 can include, for instance, processor and memory components described with respect to FIG. 18 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1900 includes a communication mechanism such as a bus 1802 for passing information among the components of the chip set 1900. A processor 1904 has connectivity to bus 1902 to execute instructions and process information stored in a memory 1906. Processor 1904 includes one or more processing cores with each core configured to perform independently. A multi-core processor enables multiprocessing within a single physical package. Examples of a multi-core processor include two, four, eight, or greater numbers of processing cores. Alternatively or in addition, processor 1904 includes one or more microprocessors configured in tandem via bus 1902 to enable independent execution of instructions, pipelining, and multithreading. Processor 1004 may also be accompanied with one or more specialized components to perform certain processing functions and tasks such as one or more digital signal processors (DSP) 1908, and/or one or more application-specific integrated circuits (ASIC) 1910. DSP 1908 can typically be configured to process real-world signals (e.g., sound) in real time independently of processor 1904. Similarly, ASIC 1910 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1904 and accompanying components have connectivity to the memory 1906 via bus 1902. Memory 1906 includes both dynamic memory (e.g., RAM) and static memory (e.g., ROM) for storing executable instructions that, when executed by processor 1904, DSP 1908, and/or ASIC 1910, perform the process of example embodiments as described herein. Memory 1906 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment.

Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   receiving from a first terminal, at a second terminal, at least one of a downlink modulation and coding combination (ModCod) and receive signal metrics;
   in response to receiving the at least one of a downlink ModCod and receive signal metrics, the second terminal inserting into a header of a packet a field indicating a downlink ModCod to be used by a regenerative satellite when transmitting on a downlink to the first terminal, wherein the packet destination is the first terminal; and
   after inserting the field indicating the downlink ModCod into the header of the packet, transmitting, on an uplink, the packet from the second terminal to a regenerative satellite.

2. The method of claim 1, wherein the at least one of the downlink ModCod and receive signal metrics is a downlink ModCod.

3. The method of claim 2, further comprising, in response to receiving the downlink ModCod, the second terminal updating a table indicating a downlink ModCod for the first terminal.

4. The method of claim 2, wherein the regenerative satellite is of a satellite-constellation comprising a plurality of regenerative satellites connected using inter-satellite links, and wherein the packet contains a field for routing the packet to one of the plurality of satellites.

5. The method of claim 2, wherein the second terminal comprises at least one of a gateway, a hub, and an earth station.

6. The method of claim 2, wherein the second terminal comprises a very small aperture terminal (VSAT).

7. The method of claim 2, wherein the receive signal metrics comprise a ratio of mean energy per symbol to noise power spectral density ($E_sN_0$), the method further comprising the second terminal mapping the $E_sN_0$ to the downlink ModCod.

8. A method, comprising:
   receiving a signal at a regenerative satellite;
   demodulating and decoding the received signal at the regenerative satellite to obtain a packet;
   reading, from a header of the packet, a field indicating a downlink modulation and coding combination (ModCod) to be used when transmitting on a downlink to a receiving terminal that is a destination of the packet; and
   modulating and encoding the packet at the regenerative satellite based on the indicated downlink ModCod.

9. The method of claim 8, wherein the signal is received by the regenerative satellite from a second regenerative satellite connected to the regenerative satellite over an inter satellite link.

10. The method of claim 9, wherein the regenerative satellites are in elliptical orbit or in low earth orbit.

11. The method of claim 8, wherein the signal is received by the regenerative satellite on an uplink from a transmitting terminal transmitting to the receiving terminal.

12. The method of claim 8, further comprising: transmitting, on a downlink, the modulated and encoded packet to the receiving terminal.

13. The method of claim 8, further comprising: determining at the regenerative satellite system if a destination downlink of the packet is a downlink of a different satellite.

14. A method, comprising:
   receiving a signal at a regenerative high altitude platform;
   demodulating and decoding the received signal at the regenerative high altitude platform to obtain a packet;
   reading, from a header of the packet, a field indicating a downlink modulation and coding combination (ModCod) to be used when transmitting on a downlink to a receiving terminal that is a destination of the packet;
   modulating and encoding the packet at the regenerative high altitude platform based on the indicated downlink ModCod; and
   transmitting, on a downlink, the modulated and encoded packet to the receiving terminal.

15. The method of claim 14, wherein the high altitude platform comprises an aircraft.

16. The method of claim 14, wherein the high altitude platform comprises a balloon.

17. A regenerative satellite system, comprising:
   a regenerative satellite, the regenerative satellite comprising:
      a receiver configured to receive a signal;
      circuitry for demodulating and decoding the received signal to obtain a packet;
      circuitry for reading, from a header of the packet, a field indicating a downlink modulation and coding combination (ModCod) to be used when transmitting on a downlink to a receiving terminal that is a destination of the packet; and circuitry for modulating and encoding the packet at the regenerative satellite based on the indicated downlink ModCod.

18. The regenerative satellite system of claim 17, further comprising a second regenerative satellite connected to the regenerative satellite over an inter satellite link.

19. The regenerative satellite system of claim 18, wherein the regenerative satellites are in elliptical orbit or in low earth orbit.

20. The regenerative satellite system of claim 18, further comprising: circuitry for determining if a destination downlink of the packet is a downlink of a different satellite.

21. The regenerative satellite system of claim 17, wherein the signal is received by the regenerative satellite on an uplink from a transmitting terminal transmitting to the receiving terminal.

22. The regenerative satellite system of claim 17, wherein the signal is received by the regenerative satellite from a second regenerative satellite connected to the regenerative satellite over an inter satellite link.

\* \* \* \* \*